United States Patent
Fujiwara

(10) Patent No.: US 10,025,485 B2
(45) Date of Patent: Jul. 17, 2018

(54) NON-TRANSITORY STORAGE MEDIUM STORING DISPLAY PROGRAM AND DISPLAY DEVICE

(71) Applicant: BROTHER KOGYO KABUSHIKI KAISHA, Nagoya-shi, Aichi-ken (JP)

(72) Inventor: Susumu Fujiwara, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 376 days.

(21) Appl. No.: 14/668,158

(22) Filed: Mar. 25, 2015

(65) Prior Publication Data
US 2015/0277690 A1    Oct. 1, 2015

(30) Foreign Application Priority Data
Mar. 31, 2014 (JP) ................. 2014-071924

(51) Int. Cl.
*G06F 3/0485* (2013.01)
*G06F 3/0484* (2013.01)
(Continued)

(52) U.S. Cl.
CPC .......... *G06F 3/0485* (2013.01); *G06F 3/0482* (2013.01); *G06F 3/0488* (2013.01); *G06F 17/30244* (2013.01)

(58) Field of Classification Search
CPC . G06F 3/0485; G06F 3/04847; G06F 3/04842
(Continued)

(56) References Cited

U.S. PATENT DOCUMENTS 8,130,205 B2 * 3/2012 Forstall ................. G06F 3/0482
345/173
8,332,767 B1 * 12/2012 Beil .................. G06F 17/30265
715/230
(Continued)

FOREIGN PATENT DOCUMENTS

JP    2003-016111 A    1/2003
JP    2004-185535 A    7/2004
(Continued)

OTHER PUBLICATIONS

Office Action issued in related Japanese Patent Application No. 2014-071924, dated Oct. 17, 2017.
(Continued)

*Primary Examiner* — Daeho D Song
(74) *Attorney, Agent, or Firm* — Merchant & Gould P.C.

(57) ABSTRACT

A non-transitory storage medium storing a display program that causes a display device to execute: an image display processing; a storage processing for storing arrangement information for arranging image data along a first and a second direction; a determination processing for determining whether a scroll direction of a currently displayed image is in a first or a second direction; a first image-setting processing for setting, as a target image, an image arranged in the first direction with respect to the currently displayed image, based on the arrangement information, when the direction is the first direction; and a second image-setting processing, for setting, as the target image, an image arranged in the second direction with respect to the currently displayed image, based on the arrangement information, when the direction is the second direction, wherein the target image is displayed when it is set in the first or second image-setting processing.

15 Claims, 10 Drawing Sheets

(51) Int. Cl.
 *G06F 3/0488* (2013.01)
 *G06F 17/30* (2006.01)
 *G06F 3/0482* (2013.01)

(58) Field of Classification Search
 USPC .................................................. 715/784, 854
 See application file for complete search history.

(56) References Cited

U.S. PATENT DOCUMENTS

| | | | | |
|---|---|---|---|---|
| 8,819,575 B2* | 8/2014 | Kim | .................... | G06F 3/04883 715/767 |
| 8,842,070 B2* | 9/2014 | Oakley | ................ | G06F 3/0317 345/158 |
| 9,547,525 B1* | 1/2017 | Trainor | .................... | G06F 3/017 |
| 2002/0075322 A1* | 6/2002 | Rosenzweig | ......... | G06F 3/0481 715/835 |
| 2005/0223324 A1* | 10/2005 | Tashiro | .............. | G03G 15/5016 715/273 |
| 2006/0069998 A1 | 3/2006 | Artman et al. | | |
| 2006/0077185 A1* | 4/2006 | Mashimo | ................ | A63F 13/06 345/173 |
| 2006/0156246 A1* | 7/2006 | Williams | .......... | G06F 17/30265 715/764 |
| 2006/0236251 A1* | 10/2006 | Kataoka | ................ | G06F 3/0481 715/757 |
| 2007/0101364 A1 | 5/2007 | Morita | | |
| 2007/0152981 A1* | 7/2007 | Im | ...................... | G06F 3/03547 345/173 |
| 2007/0226645 A1* | 9/2007 | Kongqiao | ............. | G06F 3/0482 715/781 |
| 2007/0273712 A1* | 11/2007 | O'Mullan | ............. | G06F 3/0481 345/650 |
| 2007/0291404 A1* | 12/2007 | Morse | .................. | G11B 27/105 360/81 |
| 2008/0052636 A1* | 2/2008 | Abe | ...................... | G06F 3/0485 715/786 |
| 2008/0080837 A1* | 4/2008 | Mei | ...................... | G06F 3/04812 386/248 |
| 2008/0120572 A1* | 5/2008 | Bahn | .................... | G06F 3/0482 715/810 |
| 2008/0294974 A1* | 11/2008 | Nurmi | ............... | G06F 17/30905 715/204 |
| 2009/0119614 A1* | 5/2009 | Tienvieri | .............. | G06F 3/0485 715/786 |
| 2009/0282340 A1* | 11/2009 | Akaike | ................ | G11B 27/105 715/732 |
| 2010/0180225 A1* | 7/2010 | Chiba | .................. | G06F 3/0481 715/777 |
| 2010/0299598 A1* | 11/2010 | Shin | ....................... | G06F 3/0488 715/702 |
| 2011/0010659 A1* | 1/2011 | Kim | ...................... | G06F 3/0485 715/784 |
| 2011/0234504 A1* | 9/2011 | Barnett | ................. | G06F 3/0482 345/173 |
| 2011/0296351 A1* | 12/2011 | Ewing, Jr. | ............ | G06F 3/0346 715/841 |
| 2012/0030625 A1* | 2/2012 | Miyazaki | .............. | G06F 3/0488 715/830 |
| 2012/0032901 A1* | 2/2012 | Kwon | ................ | G06F 3/04883 345/173 |
| 2012/0044266 A1* | 2/2012 | Mori | ........................ | G09G 5/34 345/649 |
| 2013/0083035 A1* | 4/2013 | Han | ................... | G05B 23/0272 345/473 |
| 2013/0139108 A1* | 5/2013 | Choi | ..................... | G06F 3/0482 715/823 |
| 2013/0254661 A1* | 9/2013 | Dunko | ................. | G06F 3/0488 715/716 |
| 2015/0331572 A1* | 11/2015 | Mischke | ........... | G06F 17/30053 715/769 |

FOREIGN PATENT DOCUMENTS

| | | |
|---|---|---|
| JP | 2004-356774 A | 12/2004 |
| JP | 2008-515041 A | 5/2008 |

OTHER PUBLICATIONS

Office Action issued in related Japanese Patent Application No. 2014-071924, Jan. 16, 2018.

* cited by examiner

NON-TRANSITORY STORAGE MEDIUM STORING DISPLAY PROGRAM AND DISPLAY DEVICE

CROSS REFERENCE TO RELATED APPLICATION

The present application claims priority from Japanese Patent Application No. 2014-071924, which was filed on Mar. 31, 2014, the disclosure of which is herein incorporated by reference in its entirety.

BACKGROUND OF THE INVENTION

Field of the Invention

The present invention relates to a non-transitory storage medium storing a display program and a display device.

Description of the Related Art

There is known a multimedia reproducing apparatus configured to display a menu screen having a two-dimensional arrangement. The two-dimensional arrangement is composed of a media-icon array made up by a plurality of media icons arranged in a right-left direction and a content-icon array made up by a plurality of content icons arranged in an up-down direction. When one media icon is selected from the media-icon array by a direction instruction in the right-left direction on the menu screen, there is displayed the content-icon array constituted by content icons representing a group of contents that are reproducible by a media represented by the selected one media icon, such that the content-icon array extends in the up-down direction. Thus, when a user selects one media icon and subsequently makes a direction instruction in the up-down direction, the user can select one content icon corresponding to one content to be reproduced.

SUMMARY OF THE INVENTION

In the content-icon array displayed every time when one media icon is selected, the content icons to be first displayed as selection targets are icons for preset contents. For selecting a content of a media icon different from a media icon that is being currently selected, it is needed to first select a desired media icon and to then move, in the up-down direction, content icons in a content-icon array displayed as a result of selection of the desired media icon until a desired content icon is displayed. This is rather cumbersome to a user who operates the apparatus.

The present invention has been developed to provide a non-transitory storage medium storing a display program and a display device in which one image among a plurality of images can be easily displayed in accordance with a scroll operation along two axes extending in an up-down direction and in a right-left direction, for instance.

The present invention provides a non-transitory storage medium storing a display program executable by a controller of a display device comprising: a display unit; and an operation portion configured to receive an input operation, wherein the display program, when executed by the controller, causes the display device to execute: an image display processing for displaying, on the display unit, an image based on a corresponding one of a plurality of sets of image data stored in a memory connected to the display device; an arrangement-information storage processing for storing, in the memory, arrangement information for arranging the plurality of sets of image data along a first direction according to a first condition and along a second direction according to a second condition different from the first condition; a scroll-direction determination processing for determining whether a scroll direction of a currently displayed image by a scroll operation is in the first direction or in the second direction when an input operation received through the operation portion is the scroll operation, the scroll operation being for scrolling the currently displayed image that is being currently displayed on the display unit; a first image-setting processing for setting, as a target image, an image based on image data arranged in the first direction with respect to image data of the currently displayed image on the display unit, on the basis of the arrangement information, when it is determined in the scroll-direction determination processing that the scroll direction is in the first direction; and a second image-setting processing, for setting, as the target image, an image based on image data arranged in the second direction with respect to the image data of the currently displayed image on the display unit, on the basis of the arrangement information, when it is determined in the scroll-direction determination processing that the scroll direction is in the second direction, wherein the target image is displayed on the display unit in the image display processing when the target image is set in the first image-setting processing or in the second image-setting processing.

It is noted that the present invention may be achieved in various forms such as the display device, a controller for controlling the display device, a display system, a display method, and the display program.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which.

DETAILED DESCRIPTION OF THE EMBODIMENT

Figure 1:
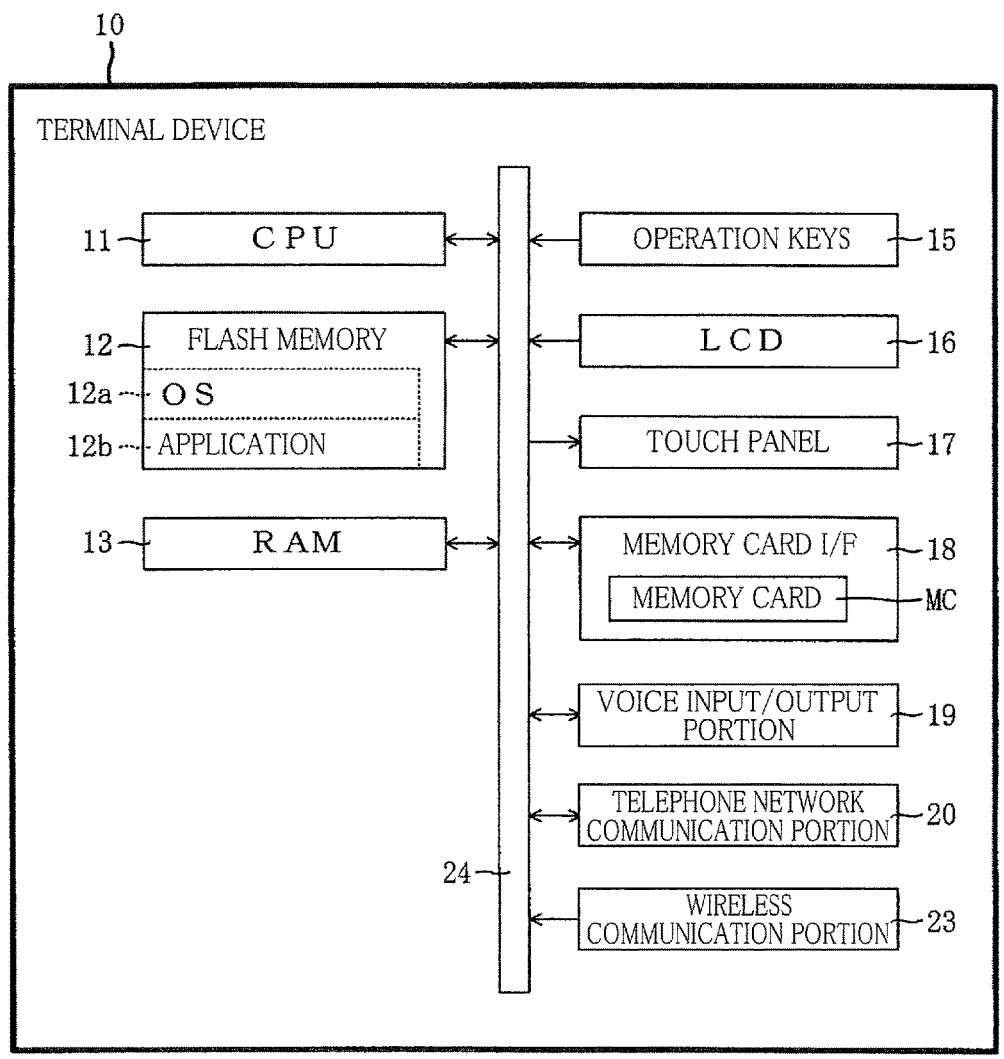
FIG. 1 is a block diagram showing an electric structure of a terminal device.

There will be explained one embodiment of the invention referring to the drawings. FIG. 1 illustrates an electric structure of a terminal device 10 on which is installed an application 12b as one embodiment of a display program according to the present invention.

In the present embodiment, the terminal device 10 is a mobile device such as a smartphone. The terminal device 10 includes a CPU 11, a flash memory 12, RAM 13, operation keys 15, an LCD 16, a touch panel 17, a memory card interface (hereinafter referred to as "memory card I/F" where appropriate) 18, a voice input/output portion 19, a telephone network communication portion 20, and a wireless communication portion 23. These are connected to one another via a bus line 24.

The CPU 11 controls various portions connected to the bus line 24 according to fixed vales, programs, and the like stored in the flash memory 12, and the like. The flash memory 12 is a rewritable non-transitory memory. The flash memory 12 stores an operating system 12a and the application 12b. Hereinafter, the operating system will be referred to as "OS" where appropriate. In the following explanation, the CPU 11 that executes a program such as the application or the operating system will be simply referred to as the name of the program where appropriate. For instance, the term "application" may mean "the CPU 11 that executes the application". The OS 12a is basic software for achieving standard functions of the terminal device 10. In the present embodiment, the OS 12a is an Android (registered trademark) OS.

The application 12b is an application provided by a vendor of various devices and installed on the terminal device 10 by a user, enabling the user to use various functions of a corresponding device from the terminal device 10. For instance, the application 12b enables the user to use a printing function and a scanning function of the device directly from the terminal device 10 not via a personal computer (PC) and the like.

In the present embodiment, the application 12b has an album function viewing images of postcards such as New Year's cards obtained by utilizing the scanning function of the device. In displaying images of postcards utilizing the album function, the application 12b causes senders and sending years of the postcards to be arranged according to respective arrangement orders. When a scroll operation, e.g., a flick operation, in an up-down direction is performed, the application 12b causes a currently displayed image to be switched to an image of a postcard whose sender is the same as that of a postcard corresponding to the currently displayed image but whose sending year is different from that of the postcard corresponding to the currently displayed image. When a scroll operation in a right-left direction is performed, the application 12b causes the currently displayed image to be switched to an image of a postcard whose sending year is the same as that of the postcard corresponding to the currently displayed image but whose sender is different from that of the postcard corresponding to the currently displayed image. Thus, the scroll operations in the up-down direction and in the right-left direction enable a desired image among images of a plurality of postcards to be easily displayed. Processings shown by flow charts of FIGS. 4-10 are executed by the CPU 11 according to the application 12b.

The RAM 13 is a rewritable volatile memory having a temporary area for temporarily storing various sorts of data when the CPU 11 executes the application 12b and the like. The operation keys 15 are mechanical keys through which instructions are input to the terminal device 10. The operation keys 15 are provided on a housing of the terminal device 10, for instance. The LCD 16 is a liquid crystal display device for displaying various screens. The touch panel 17 is superposed on the LCD 16. A user inputs instructions to the terminal device 10 by moving an input tool, such as a finger or a stylus, on or near the touch panel 17.

The memory card I/F 18 is an interface on which a rewritable nonvolatile memory card MC is mounted. The memory card I/F 18 controls writing and reading of data to and from the memory card MC. The voice input/output portion 19 is a voice input/output device including a microphone and a speaker. The telephone network communication portion 20 is a circuit for voice conversation over a mobile phone network (not shown). The wireless communication portion 23 is an interface for communication according to a wireless LAN standard, i.e., for wireless LAN communication. In the present embodiment, the wireless communication portion 23 performs wireless communication over a wireless LAN according to the IEEE802.11b/g/n standard.

Figure 2:
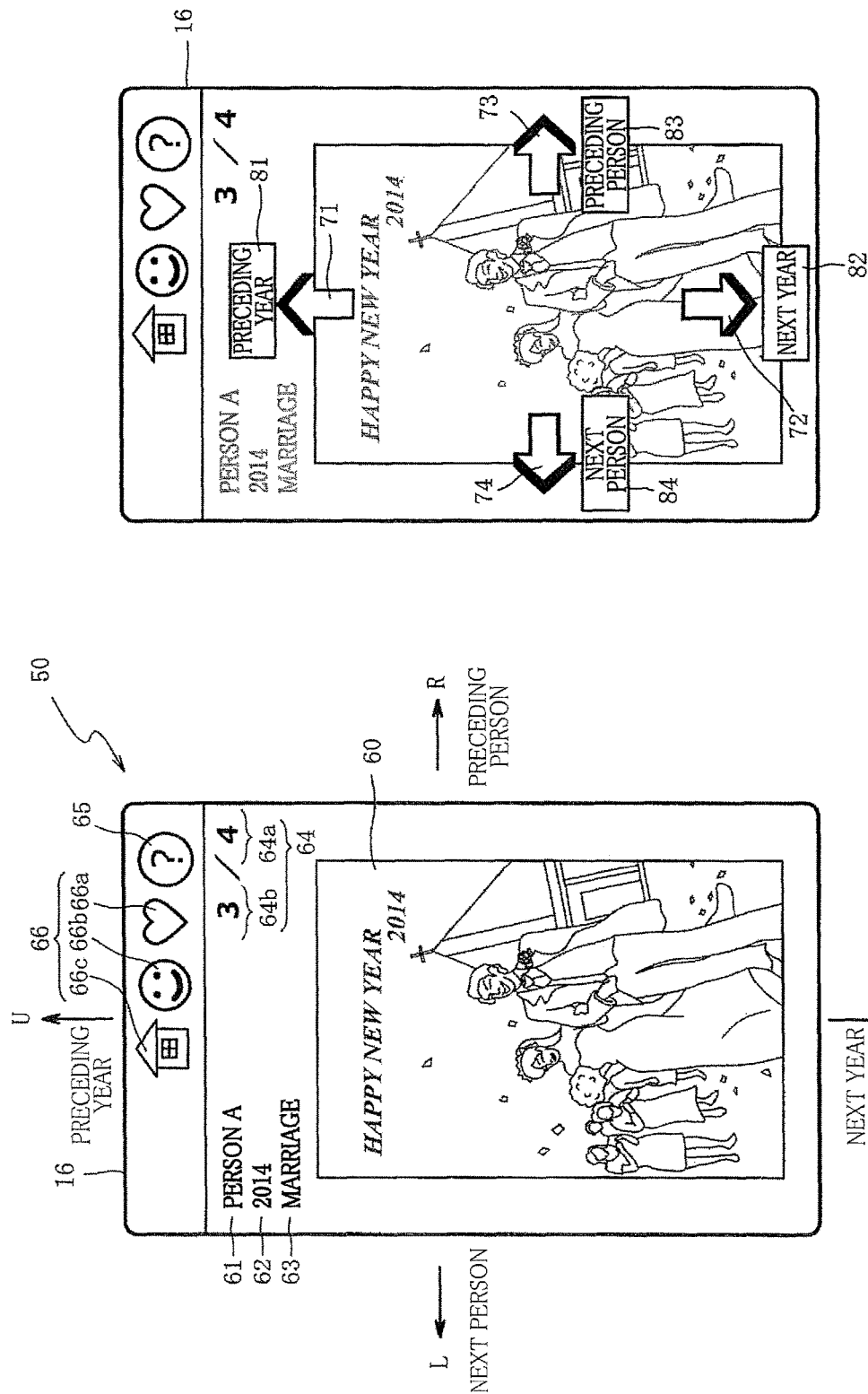
FIGS. 2A and 2B are views for schematically explaining an outline of one embodiment of the invention.

Referring next to FIG. 2, there will be explained an outline of one embodiment of the invention. FIG. 2A shows one example of a screen 50 displayed on the LCD 16 by the application 12b. One image 60 among a plurality of images that will be able to be displayed (each may be referred to as "display candidate image" or "displayable image") is displayed on the screen 50.

In the present embodiment, an image to be displayed by the application 12b is an image of a message side or an image of an address side of a postcard. Hereinafter, the image of the message side will be referred to as "message-side image" while the image of the address side will be referred to as "address-side image". Image data of each message-side image and image data of each address-side image to be displayed are obtained in advance by the application 12b through the use of the scanning function of the device and are stored in the memory card MC. Where image data of the image of the message side and image data of the image of the address side of one postcard are stored, the two sorts of image data are stored in association with each other. The image data of each message-side image and the image data of each address-side image are associated with information indicative of the sender of the postcard corresponding to the image data (hereinafter referred to as "sender information" where appropriate) and information indicative of the sending year of the postcard corresponding to the image data (hereinafter referred to as "sending-year information" where appropriate). The image data of the message-side image is associated with information indicative of the message-side image while the image data of the address-side image is associated with information indicative of the address-side image. Thus, the application 12b identifies that each of a plurality of sets of image data stored in the memory card MC is the image data of the message-side image or the image data of the address-side image, on the basis of the information. In the following description, the term "image data" may collectively refer to the plurality of sets of image data (i.e., image data sets) where appropriate. The term "image data" may also refer to each set of image data where appropriate.

In the present embodiment, when one scroll operation is performed in a downward direction (indicated by an arrow B in FIG. 2A), the application 12b displays an image corresponding to a postcard whose sender is the same as that of a postcard corresponding to a currently displayed image 60 and whose sending year is one year after the sending year (i.e., the next year of the sending year) of the postcard corresponding to the currently displayed image 60. When the scroll operation in the downward direction is performed beyond an image having the newest (latest) sending year, the application 12b displays an image having the oldest (earliest) sending year among images having the same sender.

When one scroll operation is performed in an upward direction (indicated by an arrow U in FIG. 2A), the application 12b displays an image corresponding to a postcard whose sender is the same as that of the postcard corresponding to the currently displayed image 60 and whose sending year is one year before the sending year (i.e., the preceding year) of the postcard corresponding to the currently displayed image 60. When the scroll operation in the upward direction is performed beyond an image having the oldest sending year, the application 12b displays an image having the newest sending year among images having the same sender.

When one scroll operation is performed in a rightward direction (indicated by an arrow R in FIG. 2A), the application 12b displays an image corresponding to a postcard whose sending year is the same as that of the postcard corresponding to the currently displayed image 60 and whose sender is a preceding person who precedes the sender of the postcard corresponding to the currently displayed image 60. The "preceding person" refers to a person who is adjacent to the sender of the currently displayed image 60 on a top side in an arrangement order of the senders. When the scroll operation in the rightward direction is performed beyond an image located at the top in the arrangement order of the senders, the application 12b displays an image located at the end in the arrangement order of the senders among images having the same sending year.

When one scroll operation in a leftward direction (indicated by an arrow L in FIG. 2A) is performed, the application 12b displays an image corresponding to a postcard whose sending year is the same as that of the currently displayed image 60 and whose sender is a next person who is next to the sender of the postcard corresponding to the currently displayed image 60. The "next person" refers to a person who is adjacent to the sender of the currently displayed image 60 on an end side in the arrangement order of the senders. When the scroll operation in the leftward direction is performed beyond an image located at the end in the arrangement order of the senders, the application 12b displays an image located at the top in the arrangement order of the senders among images having the same sending year.

There are displayed, above the image 60, sender information 61 and sending-year information 62 of the postcard corresponding to the currently displayed image 60, as header information of the image 60. Since the sender information 61 and the sending-year information 62 are displayed as the header information, it is possible to notify the user of the sender and the sending year of the postcard corresponding to the currently displayed image 60. The sender information 61 is a value (parameter) of a first axis that specifies the currently displayed image 60 in a two-dimensional matrix indicative of arrangement information that will be explained referring to FIG. 3. The sending-year information 62 is a value (parameter) of a second axis that specifies the currently displayed image 60 in the two-dimensional matrix. Here, the value of the first axis is an indication value of each of the image data sets in the first axis while the value of the second axis is an indication value of each of the image data sets in the second axis. The first axis and the second axis may be referred to as "first direction" and "second direction", respectively. The first direction and the second direction intersect each other.

The header information includes tag information 63. The tag information 63 is information indicative of a tag attached to the currently displayed image 60. The application 12b is configured to attach, to the image of the postcard, a tag/tags for classifying message contents of the postcard, as needed.

In the present embodiment, the application 12b prepares, as attachable tags, the following three sorts of tags, i.e., "marriage", "birth", and "house-moving".

The application 12b can attach one or a plurality of tags to the image, as needed. In the example of FIG. 2A, "marriage" is displayed as the tag information 63. This means that the tag "marriage" is attached to the currently displayed image 60. Since the tag information 63 is thus displayed as the header information, it is possible to notify the user of the tag information attached to the currently displayed image 60.

The header information includes information 64 that indicates an ordinal number of the currently displayed image 60 among images corresponding to postcards having the same sender as that of the postcard corresponding to the currently displayed image 60. The information 64 will be hereinafter referred to as "image-number information" where appropriate). The image-number information 64 is represented as "(a number 64b indicative of the ordinal number of the currently displayed image 60)/(a total image number 64a that is the total number of postcards having the same sender as that of the postcard corresponding to the currently displayed image 60). When the images that will be able to be displayed (i.e., the display candidate images or the displayable images) are narrowed down based on the tag information, the values of the total image number 64a and the number 64b change in accordance with the number of images obtained after narrowing down.

There are displayed, above the header information, icons 65, 66 for inputting instructions to the application 12b. The icon 66 is an icon for inputting an instruction to narrow down the images that will be able to be displayed (i.e., the display candidate images or the displayable images) based on a given tag. As explained above, three sorts of tags, i.e., "marriage", "birth", and "house-moving" are prepared in the application 12b, and respective three icons 66a-66c are accordingly prepared.

Specifically, the icon 66a is an icon for instructing narrowing down based on the tag "marriage". The icon 66b is an icon for instructing narrowing down based on the tag "birth". The icon 66c is an icon for instructing narrowing down based on the tag "house-moving". When a tap operation is performed on any of the icons 66a-66c, narrowing down is executed based on the tag corresponding to the tapped icon 66.

The icon 65 is an icon for inputting an instruction to display help images as one example of guidance of the present invention. When a tap operation is performed on the icon 65, the help images are displayed so as to be overlaid on the currently displayed image 60. The tap operation is an operation in which a user moves an input tool such as a finger on or near the touch panel 17 and subsequently moves the input tool away from the touch panel 17. FIG. 2B shows examples of the help images displaced as a result of the tap operation on the icon 65. The help images include arrows 71-74 and guidance indicators 81-84 corresponding to the respective arrows 71-74.

The arrows 71-74 (each as one example of an indicator) represent respective directions in which the scroll operation can be input. Each of the guidance indicators 81-84 (each as one example of an indicator) represents a direction of change of the sender or the sending year of an image to be next displayed where a scroll operation is performed in a direction indicated by a corresponding one of the four arrows 71-74. It is thus possible to notify the user of concrete operational manners for changing the images.

Figure 3:
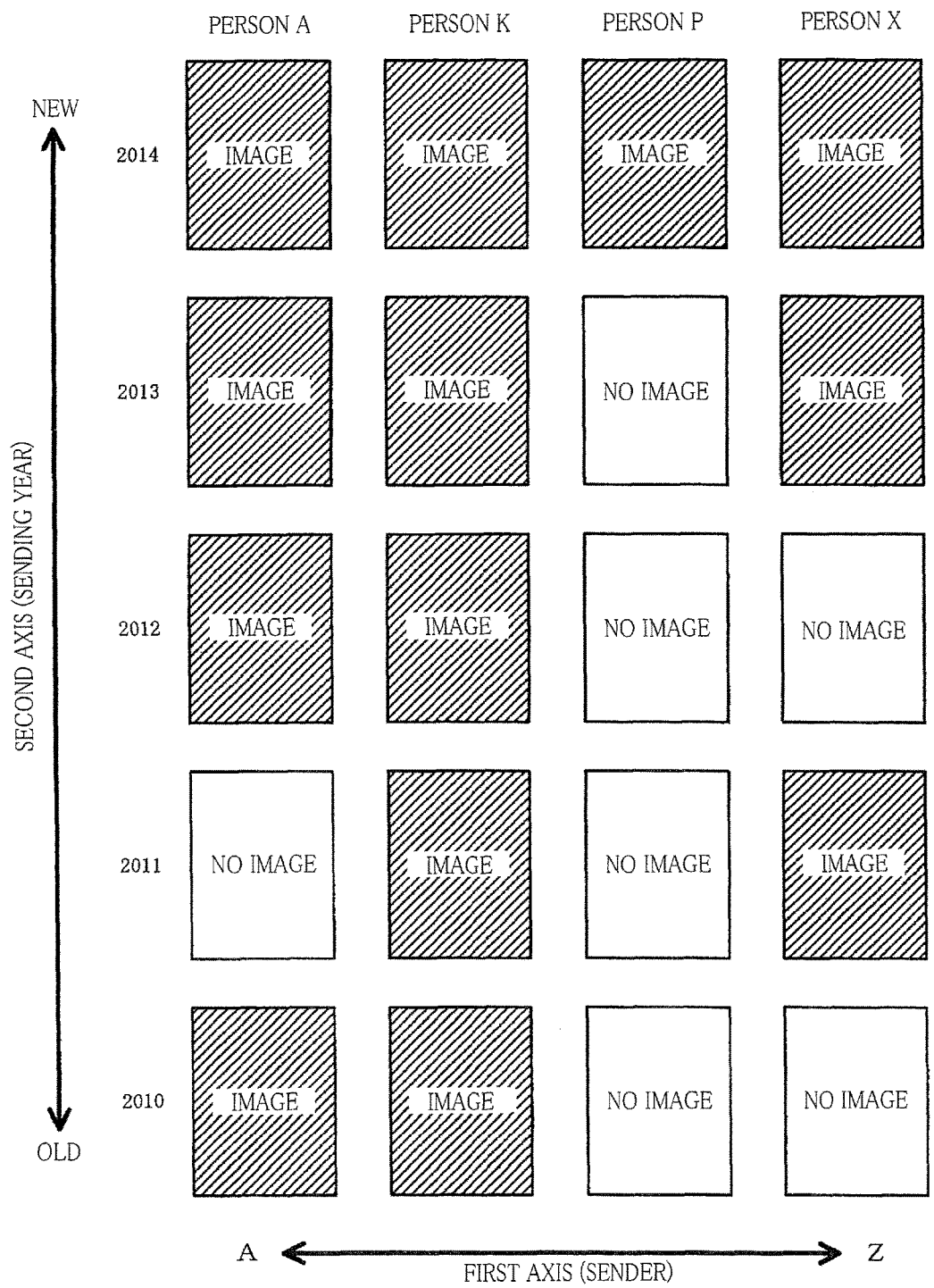
FIG. 3 is a view schematically showing a two-dimensional matrix in which a plurality of sets of image data are arranged.

FIG. 3 schematically shows the two-dimensional matrix in which are arranged the image data sets for respective images to be displayed. As shown in FIG. 3, the application 12b in the present embodiment arranges the image data sets in the form of the two-dimensional matrix composed of the first axis and the second axis.

The first axis represents senders of postcards. The image data sets are arranged along the first axis according to the arrangement order of the senders. In the present embodiment, the senders are arranged in alphabetical order. The senders may be arranged otherwise. For instance, the senders may be arranged in Japanese phonetic (a-i-u-e-o) order. The second axis represents sending years of postcards.

Each of the image data sets based on which the respective images are to be displayed is associated with information indicative of the sender and information indicative of the sending year of the corresponding postcard. Consequently, the image data sets based on which the respective images are to be displayed are arranged along the first axis in the alphabetical order of the senders and along the second axis in the arrangement order of the sending years. It is thus possible to specify each image data set on the basis of the value of the first axis and the value of the second axis.

When the touch panel 17 detects the scroll operation in the downward direction in a state in which a certain image is being displayed on the LCD 16, the application 12b refers to the arrangement information and changes the value of the second axis indicative of the image data corresponding to the currently displayed certain image in a direction in which the sending year is newer by one year than the sending year of the currently displayed certain image while maintaining the value of the first axis indicative of the image data corresponding to the currently displayed certain image. It is thus possible to select image data having the same sender as the sender of the currently displayed certain image and the sending year newer than the sending year of the currently displayed certain image by one year, as image data of an image to be next displayed on the LCD 16 (i.e., a next image), namely, as image data of a target image.

When the touch panel 17 detects the scroll operation in the downward direction in as state in which the value of the second axis indicative of the image data corresponding to the currently displayed image represents the newest sending year among the sending years of the stored image data sets, the application 12b changes the value of the second axis to a value that represents the oldest sending year. In other words, the values of the second axis are arranged in a loop.

It is not always possible to prepare, for each sender, postcards for all of the sending years, and there may be a case in which no image data specified by the value of the first axis and the value of the second axis exist, as shown in FIG. 3. In view of this, where there exist no image data specified by the maintained value of the first axis and the value of the second axis changed in the above-indicated direction in which the sending year is newer by one year, the application 12b determines, as the value of the second axis, one of the values of the second axis at which image data exists and which is the closest, in a direction toward the newest sending year, to the value of the second axis before being changed, while maintaining the value of the first axis. Thus, the application 12b selects image data specified by the maintained value of the first axis and the determined value of the second axis, as the image data of the image to be next displayed.

Where the touch panel 17 detects the scroll operation in the upward direction in a state in which a certain image is being displayed on the LCD 16, the application 12b refers to the arrangement information and changes the value of the second axis indicative of the image data corresponding to the currently displayed image in a direction in which the sending year is older by one year than the sending year of the currently displayed image while maintaining the value of the first axis indicative of the image data corresponding to the currently displayed image. It is thus possible to select image data having the same sender as the sender of the currently displayed image and the sending year older than the sending year of the currently displayed image by one year, as the image data of the image to be next displayed on the LCD 16.

Where the value of the second axis indicative of the image data corresponding to the currently displayed image represents the oldest sending year among the sending years of the stored image data sets when the touch panel 17 detects the scroll operation in the upward direction, the application 12b changes the value of the second axis to a value that represents the newest sending year. Where there exist no image data specified the maintained value of the first axis and the value of the second axis changed in the above-indicated direction in which the sending year is older by one year, the application 12b determines, as the value of the second axis, one of the values of the second axis at which the image data exists and which is the closest, in a direction toward the oldest sending year, to the value of the second axis before being changed, while maintaining the value of the first axis. Thus, the application 12b selects image data specified by the maintained value of the first axis and the determined value of the second axis, as the image data of the image to be next displayed.

Where the touch panel 17 detects the scroll operation in the rightward direction in a state in which a certain image is being displayed on the LCD 16, the application 12b refers to the arrangement information and changes the value of the first axis indicative of the image data of the currently displayed image in a direction toward the preceding sender who precedes the sender of the currently displayed image while maintaining the value of the second axis indicative of the image data of the currently displayed image. It is thus possible to select image data having the same sending year as the sending year of the currently displayed image and the sender who precedes the sender of the currently displayed image, as the image data of the image to be next displayed on the LCD 16.

Where the value of the first axis indicative of the image data corresponding to the currently displayed image represents the sender located at the top in the arrangement order of the senders (i.e., the top sender) when the touch panel 17 detects the scroll operation in the rightward direction, the application 12b changes the value of the first axis to a value that represents the sender located at the end of the arrangement order (i.e., the end sender). In other words, the values of the first axis are arranged in a loop. Where there exist no image data specified by the maintained value of the second axis and the value of the first axis changed in the above-indicated direction toward the preceding sender, the application 12b determines, as the value of the first axis, one of the values of the first axis at which the image data exists and which is the closest, in a direction toward the top sender in the arrangement order, to the value of the first axis before being changed, while maintaining the value of the second axis. Thus, the application 12b selects image data specified by the maintained value of the second axis and the determined value of the first axis, as the image data of the image to be next displayed.

When the touch panel 17 detects the scroll operation in the leftward direction in a state in which a certain image is being displayed on the LCD 16, the application 12b refers to the arrangement information and changes the value of the first axis indicative of the image data corresponding to the currently displayed image in a direction toward the next sender who comes next to or who follows the sender of the currently displayed image while maintaining the value of the second axis indicative of the image data corresponding to the currently displayed image. It is thus possible to select image data having the same sending year and the sender who comes next to the sender of the currently displayed image, as image data of the image to be next displayed on the LCD 16.

Where the value of the first axis indicative of the image data corresponding to the currently displayed image represents the end sender in the arrangement order when the touch panel 17 detects the scroll operation in the leftward direction, the application 12b changes the value of the first axis to a value that represents the top sender in the arrangement order. Where there exist no image data specified by the maintained value of the second axis and the value of the first axis changed toward the next sender, the application 12b determines, as the value of the first axis, one of the values of the first axis at which the image data exists and which is the closest, in a direction toward the end sender, to the value of the first axis before being changed, while maintaining the value of the second axis. Thus, the application 12b selects image data specified by the maintained value of the second axis and the determined value of the first axis, as the image data of the image to be next displayed.

Figure 4:
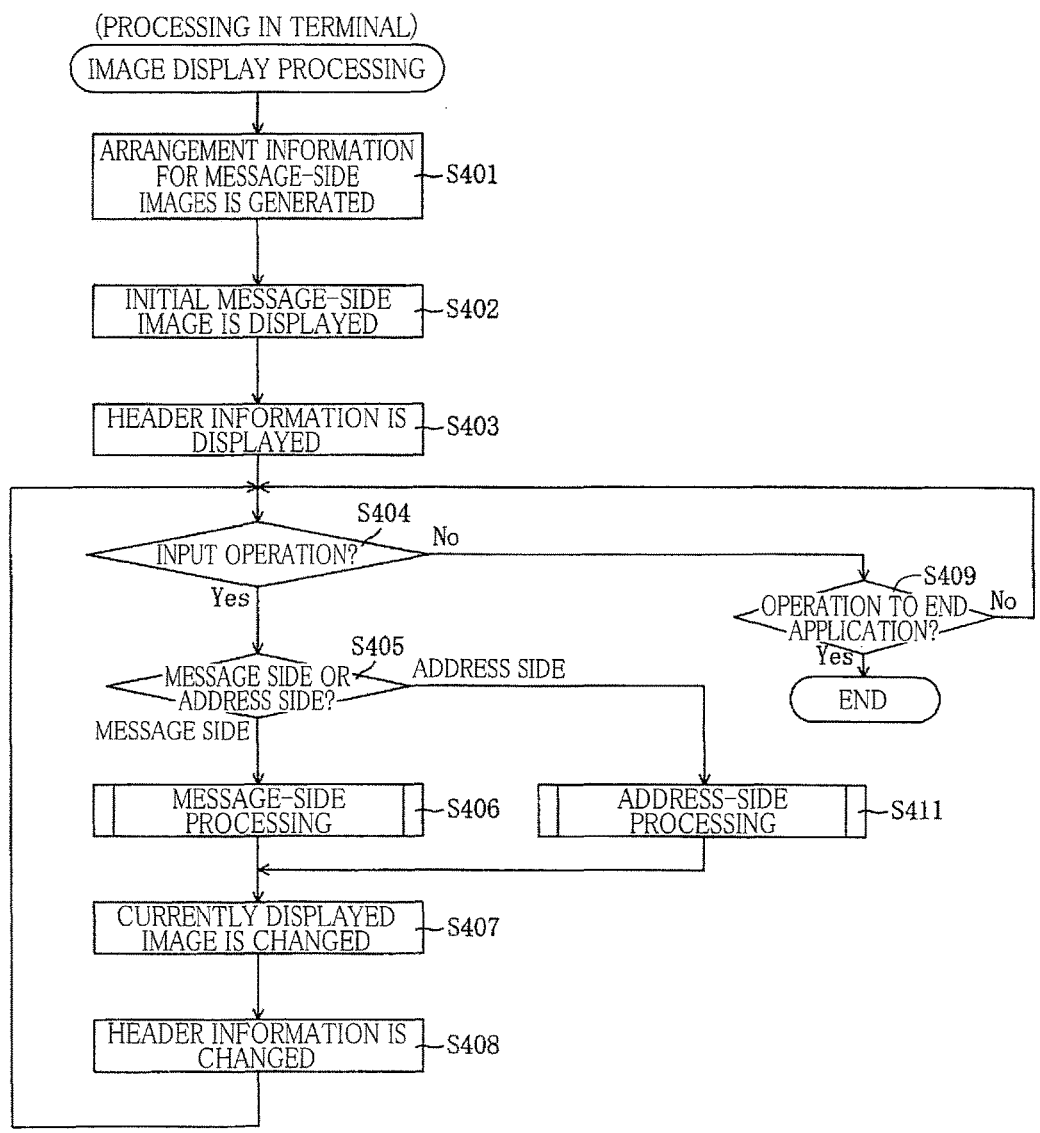
FIG. 4 is a flow chart showing an image display processing.

The flow chart of FIG. 4 shows an image display processing executed by the CPU 11 according to the application 12b. This processing is initiated when execution of the album function is commanded after startup of the application 12b. The CPU 11 generates arrangement information for the image data of the message-side images in the form of the two-dimensional matrix in which the first axis represents the sender and the second axis represents the sending year, and the CPU 11 stores the generated arrangement information in the RAM 13 (S401).

The CPU 11 displays, on the LCD 16, an initial message-side image among the message-side images that will be able to be displayed (each as the display candidate image or the displayable image), as the image 60 (S402). Examples of the initial message-side image include a message-side image specified by a top value of the first axis and a top value of the second axis in the arrangement information generated at S401. In this case, where no such message-side image exist, there is displayed, as the initial message-side image, a message-side image that comes first when one of the value of the first axis and the value of the second value is maintained at the top value while the other of the value of the first axis and the value of the second value is changed toward the end value. Alternatively, where the image lastly displayed when the album function was previously utilized is stored, the message-side image of the sender corresponding to the lastly stored image may be displayed as the initial message-side image.

The CPU 11 displays the header information corresponding to the initial message-side image (S403). Specifically, the CPU 11 displays, on the LCD 16, the sender information 61 and the sending-year information 62 associated with the displayed image, the tag information 63 attached to the message-side image, and the image-number information 64 relating to the sender of the postcard corresponding to the message-side image, as the header information. The CPU 11 also displays the icons 65, 66 on the LCD 16.

The CPU 11 waits for an input operation to utilize the album function or an operation to end the application 12b (S404: No, S409: No). When the CPU 11 determines that the operation to end the application 12b is input (S409: Yes), the CPU 11 ends the processing.

When the CPU 11 determines that the input operation to utilize the album function is input (S404: Yes), the CPU 11 determines whether the currently displayed image is an image for the message side of the postcard or an image for the address side of the postcard (S405). When the CPU 11 determines that the currently displayed image is the image for the message side (S405: message side), the CPU 11 executes a message-side processing that is executed when the message-side image is displayed (S406). The message-side processing (S406) will be later explained in detail referring to FIGS. 5-7.

Where the CPU 11 determines that the currently displayed image is the image for the address side (S405: address side), the CPU 11 executes an address-side processing that is executed when the address-side image is displayed (S411). The address-side processing (S411) will be later explained in detail referring to FIGS. 8-10.

After S406 or S411, the CPU 11 displays, as the image 60, an image set at S406 or S411 as an image to be next displayed (i.e., next image), on the LCD 16 (S407). That is, the CPU 11 displays the image set as the next image by scrolling from the currently displayed image. Here, "scrolling" means not only that the image is scrolled by animation display but also that the currently displayed image on the LCD 16 is changed to the next image as if the currently displayed image on the LCD 16 is scrolled in a given direction without animation display. In the present embodiment, "scrolling" means the latter.

The CPU 11 displays the header information corresponding to the image displayed at S407, namely, the image set as the next image at S406 or S411 (S408). That is, the CPU 11 displays, as the header information, the sender information 61, the sending-year information 62, the tag information 63, and the image-number information 64 corresponding to the image displayed at S407. After S408, the CPU 11 executes S404.

Figure 5:
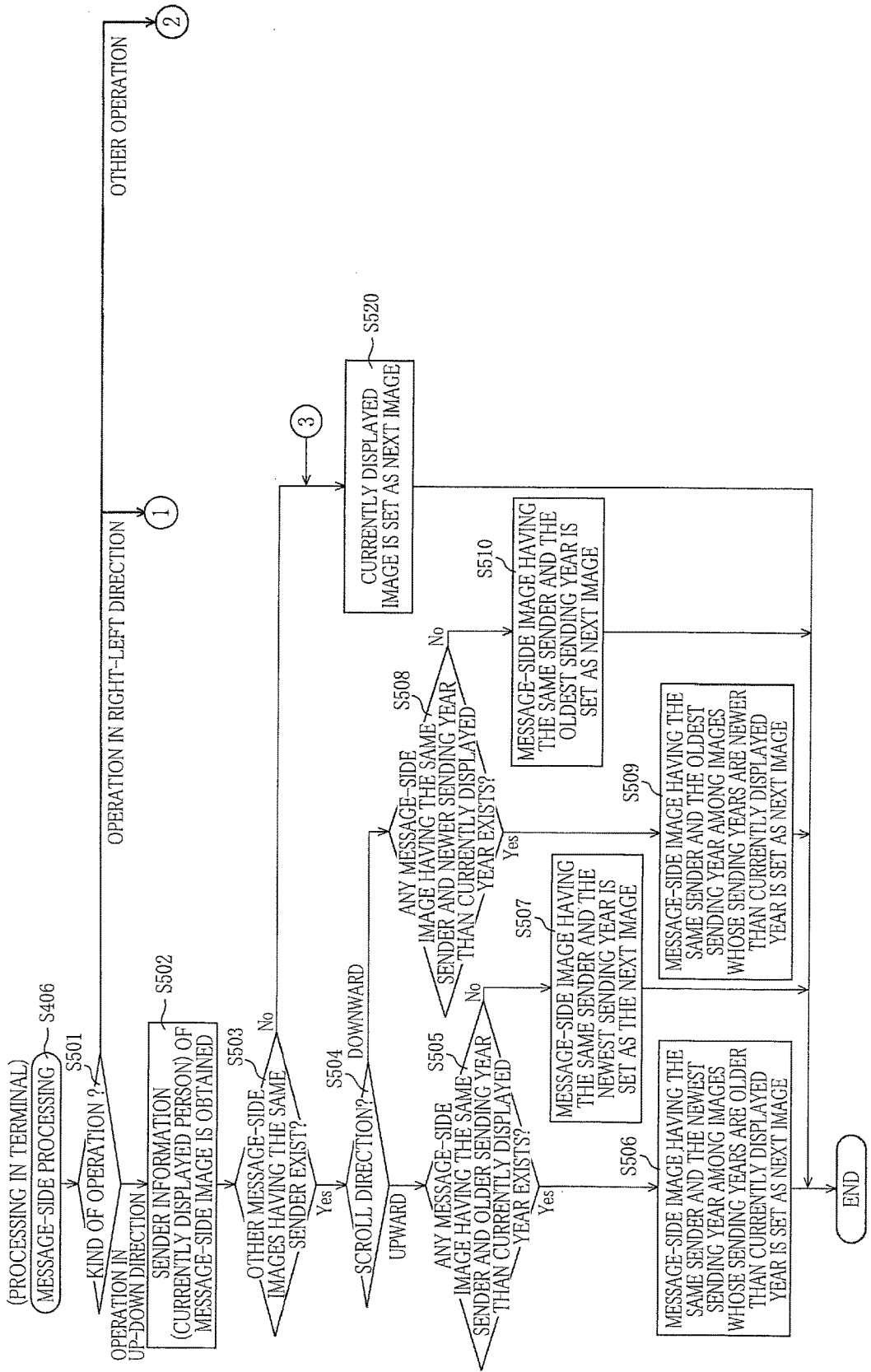
FIG. 5 is a flow chart showing a part of a message-side processing.
Figure 6:
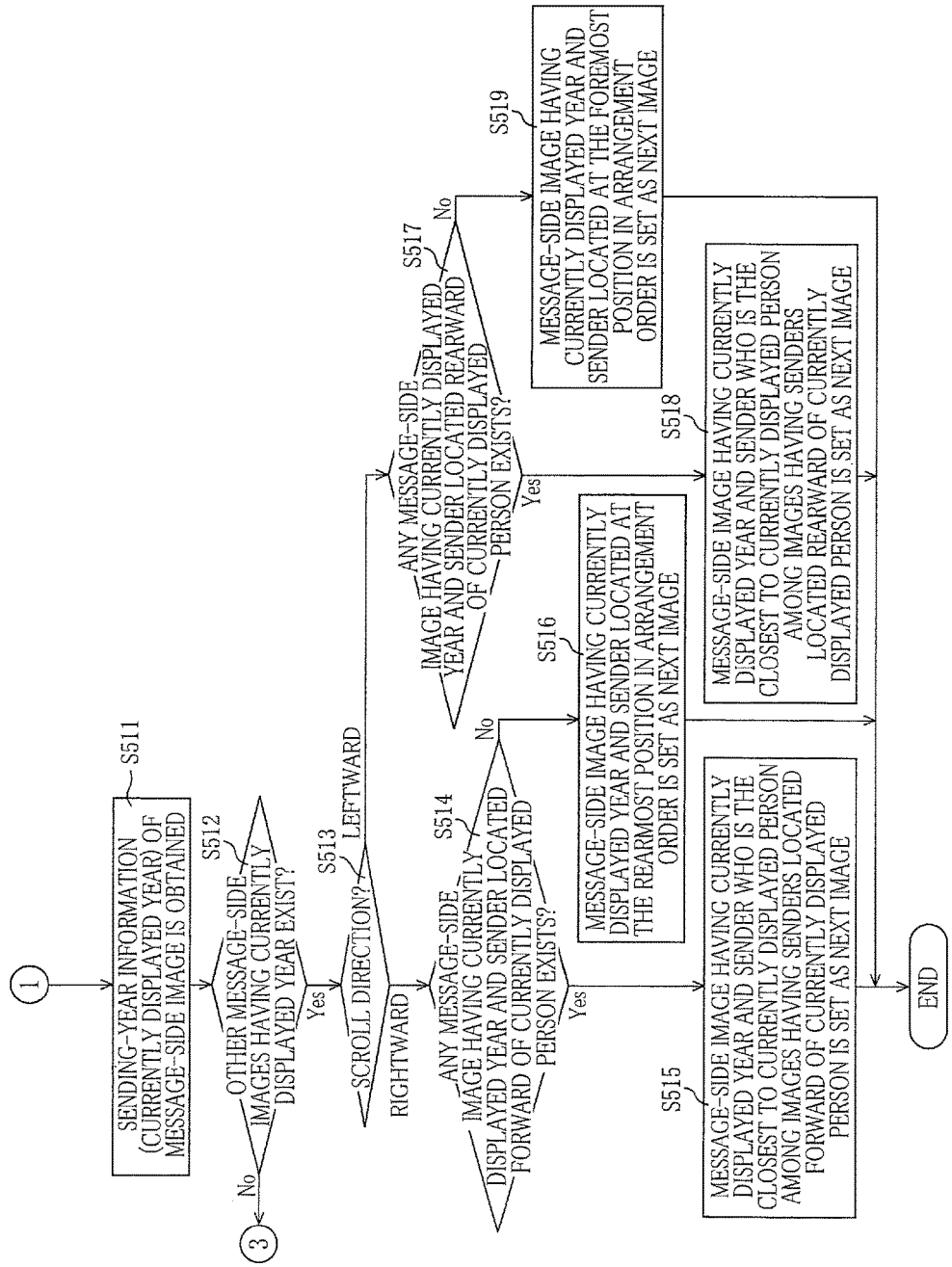
FIG. 6 is a flow chart showing another part of the message-side processing.
Figure 7:
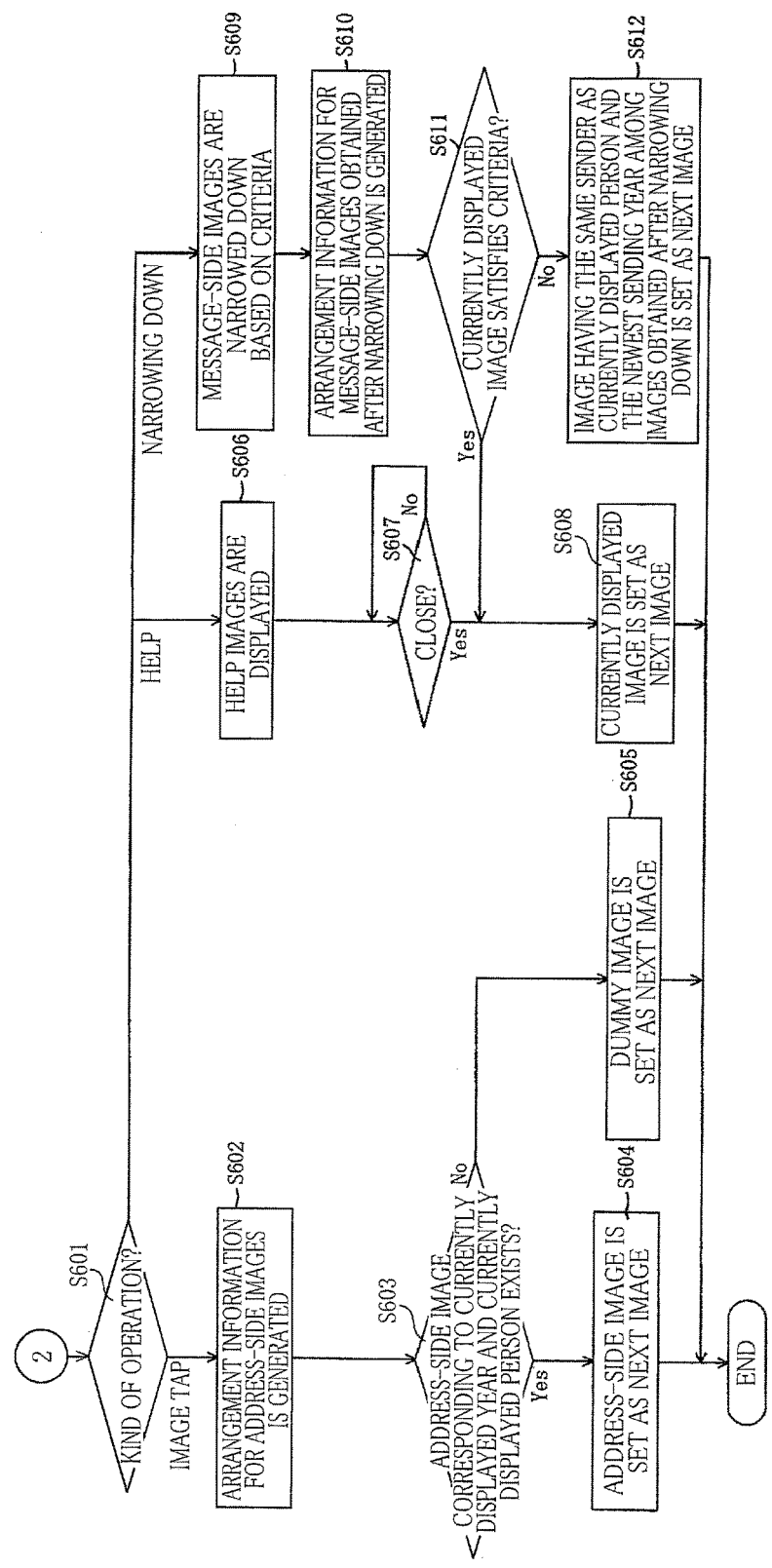
FIG. 7 is a flow chart showing still another part of the message-side processing.

The flow charts of FIGS. 5-7 show the message-side processing (S406). The CPU 11 determines the kind of the input operation (S501). When the CPU 11 determines that the input operation is the scroll operation in the up-down direction (S501: operation in up-down direction), the CPU 11 executes S502. In the present embodiment, the scroll operation for scrolling the image 60 is a flick operation. The flick operation is an operation in which a user moves an input tool such as a finger on or near to the touch panel 17 and flicks the input tool in a given operating direction.

The CPU 11 obtains the sender information of the currently displayed message-side image (S502). The CPU 11 refers to the arrangement information for the message-side images and determines whether there exist any other message-side images having the same sender as the sender indicated by the obtained sender information (S503). Where the CPU 11 determines that there do not exist any other message-side images (S503: No), the CPU 11 sets the currently displayed message-side image as the next image (S520) and ends the processing. In this case, because the next image is identical to the currently displayed message-side image, the CPU 11 maintains the currently displayed image 60 as it is at S407 executed thereafter.

On the other hand, when the CPU 11 determines that there exist other message-side images (S503: Yes), the CPU 11 determines whether the direction of the scroll operation (hereinafter referred to as "scroll direction" where appropriate) is upward or downward (S504). When the CPU 11 determines that the scroll direction is upward (S504: upward), the CPU 11 refers to the arrangement information for the message-side images and determines whether there exists any message-side image having the same sender as the sender indicated by the sender information obtained at S502, namely, the same sender as the sender of the currently displayed message-side image and having the sending year older than the sending year of the currently displayed message-side image (hereinafter referred to as "currently displayed year" where appropriate) (S505).

When the CPU 11 determines that such message-side images exist (S505: Yes), the CPU 11 refers to the arrangement information for the message-side images and sets, as the next image, one of the message-side images having the same sender as the sender of the currently displayed message-side image and having the newest sending year among the message-side images whose sending years are older than the currently displayed year (S506), and ends the processing.

Where there exists a postcard whose sender is the same as the sender corresponding to the currently displayed message-side image and whose sending year is one year before the currently displayed year, the CPU 11 sets, as the next image, the message-side image of the postcard whose sending year is one year before the currently displayed year. On the other hand, where there exist no postcard whose sending year is one year before the currently displayed year, the CPU 11 sets, as the next image, the message-side image of a postcard whose sending year is the closest to the currently displayed year in a direction toward the older sending years than the currently displayed year among the postcards having the same sender.

After S506, the CPU 11, at S407 executed thereafter, scrolls the currently displayed image 60 in the upward direction and changes the image 60 to be next displayed on the LCD 16 to the next image set at S506.

When the CPU 11 determines at S505 that there exist no message-side images having the same sender and having the sending year older than the currently displayed year (S505: No), the CPU 11 refers to the arrangement information for the message-side images and sets, as the next image, the message-side image having the same sender as the sender corresponding to the currently displayed message-side image and having the newest sending year (S507). Thereafter, the CPU 11 ends the processing. After S507, the CPU 11, at S407 executed thereafter, scrolls the currently displayed image 60 in the upward direction and changes the image 60 to be next displayed on the LCD 16 to the next image set at S507.

When the CPU 11 determines that the scroll direction is downward (S504: downward), the CPU 11 refers to the arrangement information for the message-side images and determines whether there exists any message-side image having the same sender as the sender of the currently displayed message-side image and having the sending year newer than the currently displayed year (S508).

When the CPU 11 determines that such message-side images exist (S508: Yes), the CPU 11 refers to the arrangement information for the message-side images and sets, as the next image, one of the message-side images having the same sender as the sender of the currently displayed message-side image and having the oldest sending year among the message-side images whose sending years are newer than the currently displayed year (S509), and ends the processing.

Where there exists a postcard whose sender is the same as the sender corresponding to the currently displayed message-side image and whose sending year is one year after the currently displayed year, the CPU 11 sets, as the next image, the message-side image of the postcard whose sending year is one year after the currently displayed year. On the other hand, where there exist no postcard whose sending year is one year after the currently displayed year, the CPU 11 sets, as the next image, the message-side image of a postcard whose sending year is the closest to the currently displayed year in a direction toward the newer sending years than the currently displayed year among the postcards having the same sender.

After S509, the CPU 11, at S407 executed thereafter, scrolls the currently displayed image 60 in the downward direction and changes the image 60 to be next displayed on the LCD 16 to the next image set at S509.

When the CPU 11 determines at S508 that there exist no message-side images having the same sender and having the sending year newer than the currently displayed year (S508: No), the CPU 11 refers to the arrangement information for the message-side images and sets, as the next image, the message-side image having the same sender as the sender corresponding to the currently displayed message-side image and having the oldest sending year (S510). Thereafter, the CPU 11 ends the processing. After S510, the CPU 11, at S407 executed thereafter, scrolls the currently displayed image 60 in the downward direction and changes the image 60 to be next displayed on the LCD 16 to the next image set at S510.

When the CPU 11 determines at S501 that the input operation is the scroll operation in the right-left direction (S501: operation in right-left direction), the CPU 11 obtains the sending-year information of the currently displayed message-side image (S511). The CPU 11 refers to the arrangement information for the message-side images and determines whether there exists any other message-side images having the same sending year as the sending year indicated by the obtained sending-year information, namely, the currently displayed year (S512). When the CPU 11 determines that there do not exist any other message-side images (S512: No), the CPU 11 executes S520.

On the other hand, when the CPU 11 determines that there exist other message-side images (S512: Yes), the CPU 11 determines whether the scroll direction is rightward or leftward (S513). When the CPU 11 determines that the scroll direction is rightward (S513: rightward), the CPU 11 refers to the arrangement information for the message-side images and determines whether there exists any message-side image having the same sending year as the currently displayed year and having the sender who is located forward of the sender of the currently displayed message-side image (hereinafter referred to as "currently displayed person" where appropriate), namely, who is located on one of opposite sides of the currently displayed person that is nearer to the top side in the arrangement order along the first axis (S514).

When the CPU 11 determines that such message-side images exist (S514: Yes), the CPU 11 refers to the arrangement information for the message-side images and sets, as the next image, the message-side image having the same sending year as the currently displayed year and having the sender who is the closest to the currently displayed person among the senders located forward of the currently displayed person (S515). Thereafter, the CPU 11 ends the processing.

Where there exists a postcard whose sending year is the same as the currently displayed year and whose sender is a preceding person who is adjacent to the currently displayed person on the top side in the arrangement order along the first axis, the CPU 11 sets, as the next image, the message-side image of the postcard in question, namely, the message-side image of the postcard of the preceding person. On the other hand, where there exist no postcard whose sender is the preceding person who is adjacent to the currently displayed person on the top side in the arrangement order along the first axis, the CPU 11 sets, as the next image, the message-side image of the postcard whose sending year is the same as the currently displayed year and whose sender is the closest to the currently displayed person among the postcards having the senders located forward of the currently displayed person.

After S515, the CPU 11, at S407 executed thereafter, scrolls the currently displayed image 60 in the rightward direction and changes the image 60 to be next displayed on the LCD 16 to the next image set at S515.

When the CPU 11 determines at S514 that there exist no message-side image having the same sending year as the currently displayed year and having the sender who is located forward of the currently displayed person (S514: No), the CPU 11 refers to the arrangement information for the message-side images and sets, as the next image, the message-side image having the same sending year as the currently displayed year and having the sender who is located at the rearmost position in the arrangement order of the senders, namely, who is located at the end in the arrangement order along the first axis (S516). Thereafter, the CPU 11 ends the processing. After S516, the CPU 11, at S407 executed thereafter, scrolls the currently displayed image 60 in the rightward direction and changes the image 60 to be next displayed on the LCD 16 to the next image set at S516.

When the CPU 11 determines that the scroll direction is leftward (S513: leftward), the CPU 11 refers to the arrangement information for the message-side images and determines whether there exists any message-side image having the same sending year as the currently displayed year and having the sender who is located rearward of the currently displayed person (S517).

When the CPU 11 determines that such message-side images exist (S517: Yes), the CPU 11 refers to the arrangement information for the message-side images and sets, as the next image, the message-side image having the same sending year as the currently displayed year and having the sender who is the closest to the currently displayed person among the senders located rearward of the currently displayed person (S518). Thereafter, the CPU 11 ends the processing.

Where there exists a postcard whose sending year is the same as the currently displayed year and whose sender is a next person who is adjacent to the currently displayed person on the end side in the arrangement order along the first axis, the CPU 11 sets, as the next image, the message-side image of the postcard in question, namely, the message-side image of the postcard of the next person. On the other hand, where there exist no postcard whose sender is the next person who is adjacent to the currently displayed person on the end side in the arrangement order along the first axis, the CPU 11 sets, as the next image, the message-side image of the postcard whose sending year is the same as the currently displayed year and whose sender is the closest to the currently displayed person among the postcards having the senders located rearward of the currently displayed person.

After S518, the CPU 11, at S407 executed thereafter, scrolls the currently displayed image 60 in the leftward direction and changes the image 60 to be next displayed on the LCD 16 to the next image set at S518.

When the CPU 11 determines that there exist no message-side images having the same sending year as the currently displayed year and having the sender who is located rearward of the currently displayed person (S517: No), the CPU 11 refers to the arrangement information for the message-side images and sets, as the next image, the message-side image having the same sending year as the currently displayed year and having the sender who is located at the foremost position in the arrangement order of the senders, namely, who is located at the top in the arrangement order along the first axis (S519). Thereafter, the CPU 11 ends the processing. After S519, the CPU 11, at S407 executed thereafter, scrolls the currently displayed image 60 in the leftward direction and changes the image 60 to be next displayed on the LCD 16 to the next image set at S519.

When the CPU 11 determines that the input operation is an operation other than the scroll operations in the up-down direction and in the right-left direction (S501: other operation), the CPU 11 executes S601 in FIG. 7 and determines the kind of the input operation as in S501. When the CPU 11 determines that the input operation is a tap operation on the currently displayed message-side image 60 (S601: image tap), the CPU 11 generates arrangement information for the image data of the address-side images in the form of the two-dimensional matrix in which the first axis represents the sender and the second axis represents the sending year, and the CPU 11 stores the generated arrangement information in the RAM 13 (S602).

The CPU 11 determines whether there exists an address-side image corresponding to the currently displayed year and the currently displayed person (S603). When the CPU 11 determines that such an address-side image exists (S603: Yes), the CPU 11 sets the address-side image in question as the next image (S604). Thereafter, the CPU 11 ends the processing. After S604, the CPU 11, at S407 executed thereafter, changes the currently displayed message-side image 60 to the address-side image set as the next image at S604. Consequently, the address-side image 60 is displayed on the LCD 16 as if the postcard is turned over such that the message side of the postcard faces downward.

On the other hand, when the CPU 11 determines that there exist no address-side image corresponding to the currently displayed year and the currently displayed person (S603: No), the CPU 11 sets a dummy image as the next image (S605) and ends the processing. After S605, the CPU 11, at S407 executed thereafter, changes the currently message-side image 60 to the dummy image set as the next image at S605.

The dummy image in the present embodiment includes the sender information and the sending-year information associated with the currently displayed message-side image 60. It is thus possible to notify, to the user, with respect to which message-side image there does not exist a corresponding address-side image. The dummy image may include contents other than the sender information and the sending-year information or need not include the sender information and the sending-year information. Alternatively, the dummy image may be a common image irrespective of the sender and the sending year. The dummy image may be created when the dummy image is set as the next image or may be created in advance and stored in the RAM 13.

When the CPU 11 determines at S601 that the input operation is a tap operation on the icon 65 (S601: help), the CPU 11 displays the help images so as to be overlaid on the currently displayed message-side image (S606). After S606, the help images shown in FIG. 2B are displayed, for instance. The CPU 11 waits for an input operation to close the help images (S607: No). The operation to close the help images may be a tap operation on the icon 65 in a state in which the help images are being displayed. When the CPU 11 determines that the operation to close the help images is input (S607: Yes), the CPU 11 sets the currently displayed message-side image as the next image (S608) and ends the processing. Since the next image is identical to the currently displayed message-side image in this case, the CPU 11 maintains, at S407 executed thereafter, the currently displayed image 60 as it is.

When the CPU 11 determines at S601 that the input operation is a tap operation on any one of the icons 66a-66c (S601: narrowing down), the message-side images that are elements constituting the current arrangement information are narrowed down based on criteria according to the tapped one of the icons 66a-66c (S609). The CPU 11 then generates arrangement information for the image data of the message-side images obtained after narrowing down in the form of the two-dimensional matrix in which the first axis represents the sender while the second axis represents the sending year. The generated information is stored in the RAM 13 (S610).

The CPU 11 determines whether the currently displayed image 60 satisfies the criteria, namely, whether the currently displayed image 60 is included in the message-side images obtained after narrowing down (S611). When the CPU 11 determines that the currently displayed image 60 satisfies the criteria (S611: Yes), the CPU 11 executes S608. In this case, the currently displayed image 60 continues to be displayed. When narrowing down is executed at S609, the total image number 64a displayed as the header information on the LCD 16 is equal to the number of message-side images obtained after narrowing down.

When the CPU 11 determines that the currently displayed image 60 does not satisfy the criteria (S611: No), the CPU 11 refers to the arrangement information generated at S610 and sets, as the next image, the message-side image which has the same sender as the sender of the currently displayed message-side image and which has the newest sending year among the message-side images obtained after narrowing down (S612). Thereafter, the CPU 11 ends the processing. After S612, the CPU 11, at S407 executed thereafter, changes the currently displayed image 60 to the next image set at S612.

Figure 8:
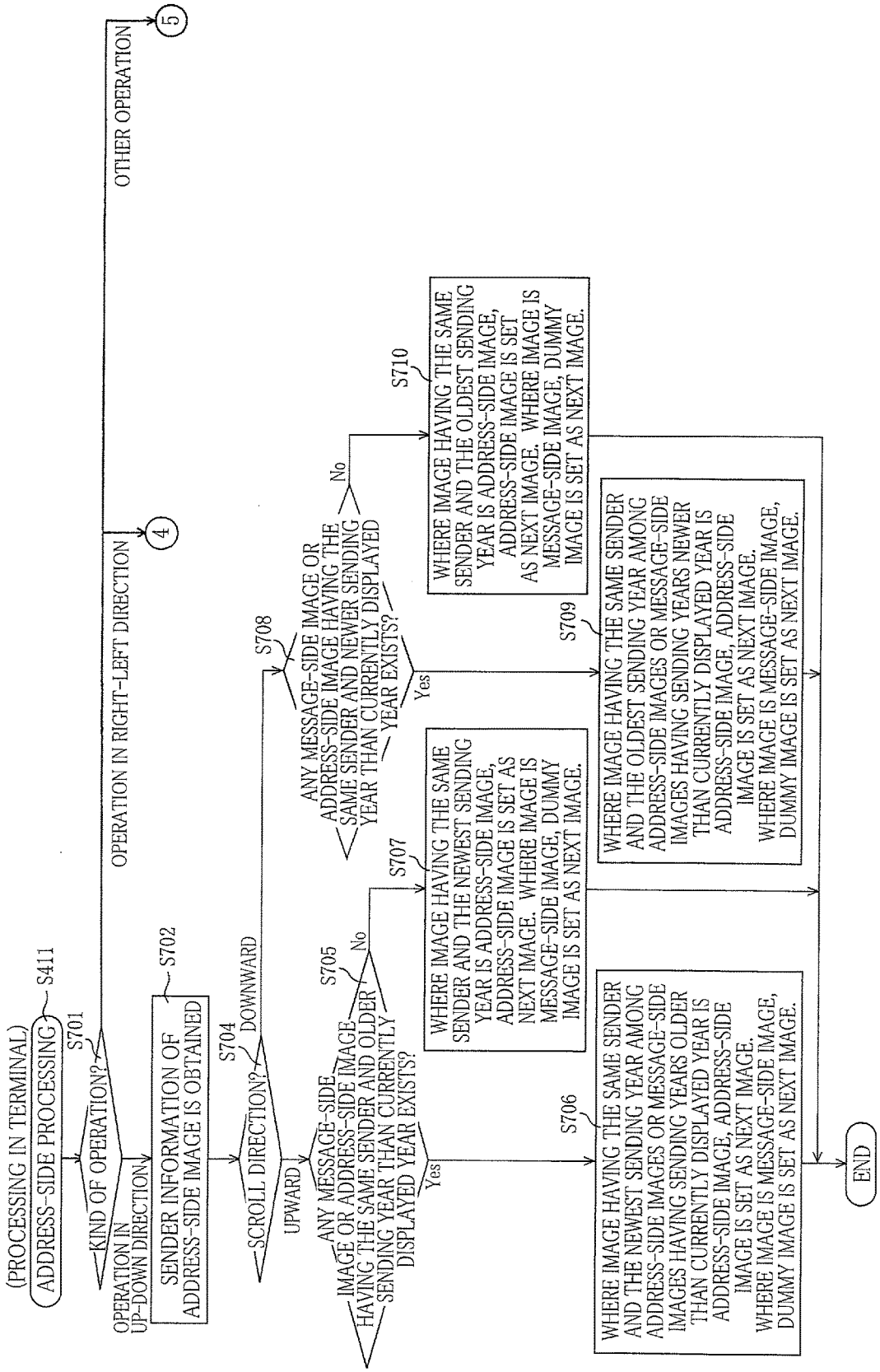
FIG. 8 is a flow chart showing a part of an address-side processing.
Figure 9:
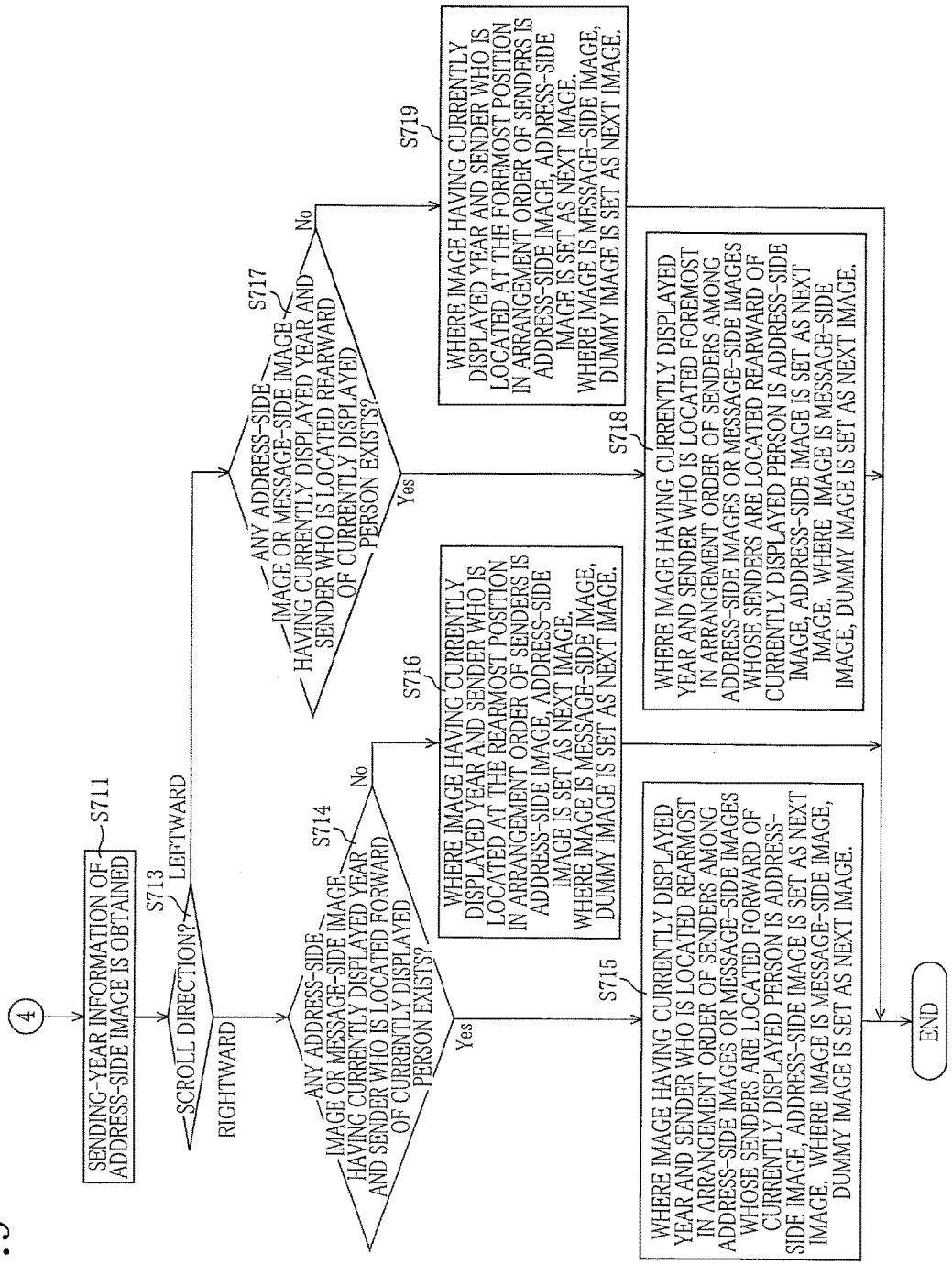
FIG. 9 is a flow chart showing another part of the address-side processing.
Figure 10:
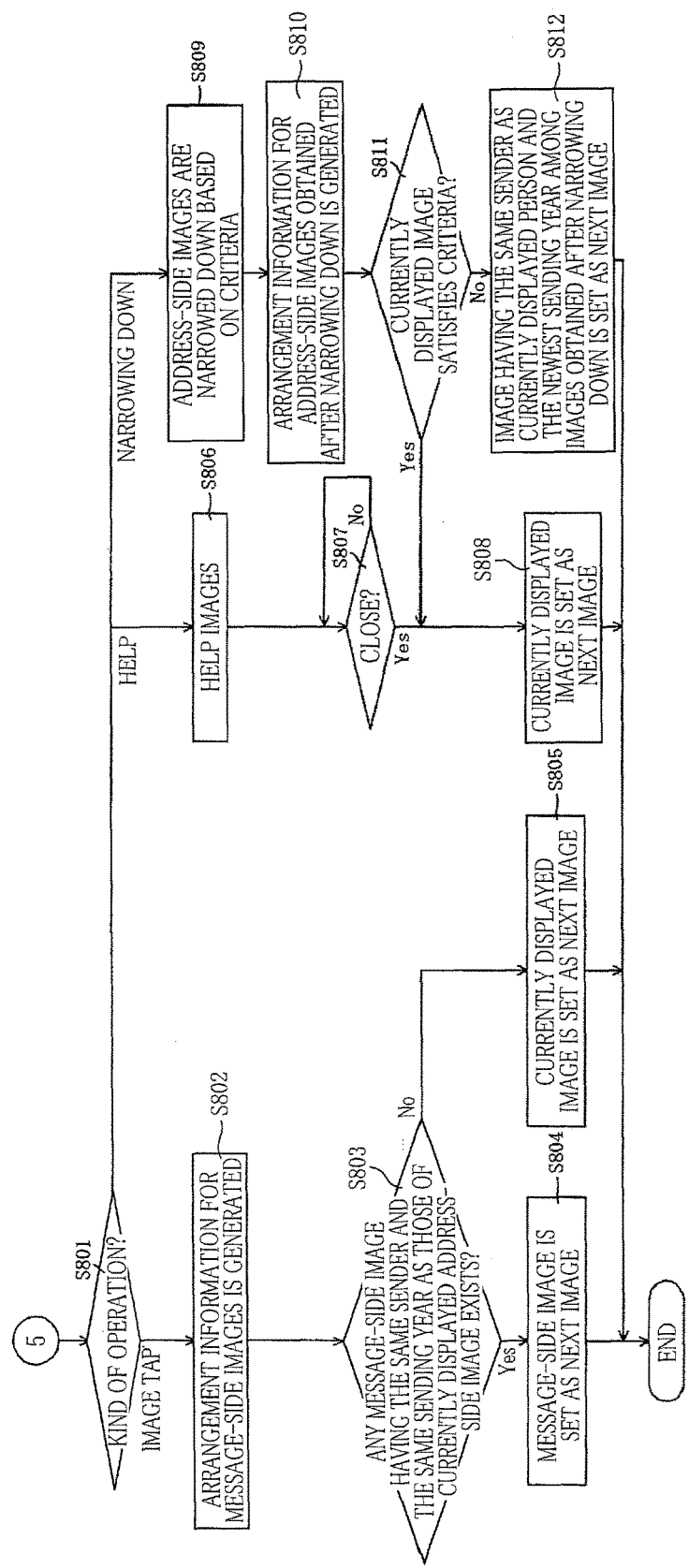
FIG. 10 is a flow chart showing still another part of the address-side processing.

The flow charts of FIGS. 8-10 indicate the address-side processing (S411). The CPU 11 determines the kind of the input operation (S701). When the CPU 11 determines that the input operation is the scroll operation in the up-down direction (S701: operation in up-down direction), the CPU 11 obtains the sender information of the currently displayed address-side image (S702).

The CPU 11 determines whether the scroll direction is upward or downward (S704). When the CPU 11 determines that the scroll direction is upward (S704: upward), the CPU 11 refers to the arrangement information for the message-side images and the arrangement information for the address-side images and determines whether there exists any address-side image or message-side image which has the same sender as the sender indicated by the sender information obtained at S702, namely, the same sender as the sender of the currently displayed address-side image and which has the sending year older than the currently displayed year (S705).

When the CPU 11 determines that such address-side images or message-side images exist (S705: Yes), the CPU 11 executes S706 and thereafter ends the processing. At S706, the CPU 11 refers to the arrangement information for the message-side images and the arrangement information for the address-side images. Further, where an image which has the same sender as the sender corresponding to the currently displayed address-side image and which has the newest sending year among the address-side images or the message-side images having the sending years older than the currently displayed year is the address-side image, the CPU 11 sets the address-side image in question as the next image. On the other hand, where the above-indicated image having the newest sending year is the message-side image, the CPU 11 sets a dummy image as the next image. In this case, where the message-side image and the address-side image have the same newest sending year, the address-side image is displayed with a higher priority. After S706, the CPU 11, at S407 executed thereafter, scrolls the currently displayed image 60 in the upward direction and changes the image 60 to be next displayed on the LCD 16 to the next image set at S706.

The dummy image set at S706 and at S707, S709, S710, S715, S716, S718, and S719 later explained includes the sender information, the sending-year information, and the tag information associated with the message-side image that triggers the dummy image to be displayed.

When the CPU 11 determines at S705 that there exist no address-side image and message-side image which has the same sender as the sender of the currently displayed address-side image and which has the sending year older than the currently displayed year (S705: No), the CPU 11 executes S707 and thereafter ends the processing. At S707, the CPU 11 refers to the arrangement information for the message-side images and the arrangement information for the address-side images. Further, where an image which has the same sender as the sender corresponding to the currently displayed address-side image and which has the newest sending year is the address-side image, the CPU 11 sets the address-side image in question as the next image. On the other hand, where the image having the newest sending year is the message-side image, the CPU 11 sets a dummy image as the next image. After S707, the CPU 11, at S407 executed thereafter, scrolls the currently displayed image 60 in the upward direction and changes the image 60 to be next displayed on the LCD 16 to the next image set at S707. At S707, where there exist, for the sending years other than the sending year of the currently displayed address-side image, no address-side image and message-side image having the same sender as the sender of the currently-displayed address-side image, the currently displayed address-side image is set as the next image.

On the other hand, when the CPU 11 determines that the scroll direction is downward (S704: downward), the CPU 11 refers to the arrangement information for the message-side images and the arrangement information for the address-side images and determines whether there exist any address-side image or message-side image which has the same sender as the sender corresponding to the currently displayed address-side image and which has the sending year newer than the currently displayed year (S708).

When the CPU 11 determines that such address-side images or message-side images exist (S708: Yes), the CPU 11 executes S709 and ends the processing. At S709, the CPU 11 refers to the arrangement information for the message-side images and the arrangement information for the address-side images. Further, where an image which has the same sender as the sender corresponding to the currently displayed address-side image and which has the oldest sending year among the address-side images or the message-side images having the sending years newer than the currently displayed year is the address-side image, the CPU 11 sets the address-side image in question as the next image. On the other hand, where the above-indicated image having the oldest sending year is the message-side image, the CPU 11 sets a dummy image as the next image. In this case, where the message-side image and the address-side image have the same oldest sending year, the address-side image is displayed with a higher priority. After S709, the CPU 11, at S407 executed thereafter, scrolls the currently displayed image 60 in the downward direction and changes the image 60 to be next displayed on the LCD 16 to the next image set at S709.

When the CPU 11 determines at S708 that there exist no address-side image and message-side image which has the same sender as the sender corresponding to the currently displayed address-side image and which has the sending year newer than the currently displayed year (S708: No), the CPU 11 executes S710 and ends the processing. At S710, the CPU 11 refers to the arrangement information for the message-side images and the arrangement information for the address-side images. Further, where an image which has the same sender as the sender corresponding to the currently displayed address-side image and which has the oldest sending year is the address-side image, the CPU 11 sets the address-side image in question as the next image. On the other hand, where the image having the oldest sending year is the message-side image, the CPU 11 sets a dummy image as the next image. After S710, the CPU 11, at S407 executed thereafter, scrolls the currently displayed image 60 in the downward direction and changes the image 60 to be next displayed on the LCD 16 to the next image set at S710. At S710, where there exist, for the sending years other than the sending year of the currently displayed address-side image, no address-side image and message-side image having the same sender as the sender of the currently displayed address-side image, the currently displayed address-side image is set as the next image.

When the CPU 11 determines at S701 that the input operation is the scroll operation in the right-left direction (S701: operation in right-left direction), the CPU 11 obtains the sending-year information of the currently displayed address-side image (S711).

The CPU 11 determines whether the scroll direction is rightward or leftward (S713). When the CPU 11 determines that the scroll direction is rightward (S713: rightward), the CPU 11 refers to the arrangement information for the message-side images and the arrangement information for the address-side images and determines whether there exists any address-side image or message-side image which has the same sending year as the currently displayed year and having the sender who is located forward of the currently displayed person, namely, who is located on one of opposite sides of the currently displayed person that is nearer to the top side in the arrangement order along the first axis (S714).

When the CPU 11 determines that such address-side images or the message-side images exist (S714: Yes), the CPU 11 executes S715 and ends the processing. At S715, the CPU 11 refers to the arrangement information for the message-side images and the arrangement information for the address-side images. Further, where an image having the same sending year as the currently displayed year and having the sender who is located rearmost in the arrangement order of the senders among the address-side images or the message-side images whose senders are located forward of the currently displayed person, namely, who is located nearest to the end in the arrangement order along the first axis among the address-side images or the message-side images whose senders are located forward of the currently displayed person, is the address-side image, the CPU 11 sets the address-side image in question as the next image. On the other hand, where the image having the sender who is located rearmost in the arrangement order of the senders among the address-side images or the message-side images whose senders are located forward of the currently displayed person is the message-side image, the CPU 11 sets a dummy image as the next image. In this case, where both of the message-side image and the address-side image are the above-indicated image located rearmost, the address-side image is displayed with a higher priority. After S715, the CPU 11, at S407 executed thereafter, scrolls the currently displayed image 60 in the rightward direction and changes the image 60 to be next displayed on the LCD 16 to the next image set at S715.

When the CPU 11 determines at S714 that there exist no address-side image and message-side image which has the same sending year as the currently displayed year and having the sender who is located forward of the sender of the currently displayed person (S714: No), the CPU 11 executes S716 and ends the processing. At S716, the CPU 11 refers to the arrangement information for the message-side images and the arrangement information for the address-side images. Further, where an image having the same sending year as the currently displayed year and having the sender who is located at the rearmost position in the arrangement order of the senders, namely, who is located at the end in the arrangement order along the first axis, is the address-side image, the CPU 11 sets the address-side image in question as the next image. On the other hand, where the image having the sender who is located at the end in the arrangement order along the first axis is the message-side image, the CPU 11 sets a dummy image as the next image. After S716, the CPU 11, at S407 executed thereafter, scrolls the currently displayed image 60 in the rightward direction and changes the image 60 to be next displayed on the LCD 16 to the next image set at S716. At S716, where there exist, for the senders other than the sender of the currently displayed address-side image, no address-side images and message-side image having the same sending year as the sending year of the currently displayed address-side image, the currently displayed address-side image is set as the next image.

On the other hand, when the CPU 11 determines that the scroll direction is leftward (S713: leftward), the CPU 11 refers to the arrangement information for the message-side images and the arrangement information for the address-side images and determines whether there exists any address-side image or message-side image which has the same sending year as the currently displayed year and which has the sender who is located rearward of the currently displayed person (S717).

When the CPU 11 determines that such address-side images or message-side images exist (S717: Yes), the CPU 11 executes S718 and ends the processing. At S718, the CPU 11 refers to the arrangement information for the message-side images and the arrangement information for the address-side images. Further, where an image which has the same sending year as the currently displayed year and which has the sender who is located foremost in the arrangement order of the senders among the address-side images or the message-side images whose senders are located rearward of the currently displayed person, namely, who is located nearest to the top in the arrangement order along the first axis among the address-side images or the message-side images whose senders are located rearward of the currently displayed person, is the address-side image, the CPU 11 sets the address-side image in question as the next image. On the other hand, where the image having the sender who is located foremost in the arrangement order of the senders among the address-side images or the message-side images whose senders are located rearward of the currently displayed person is the message-side image, the CPU 11 sets a dummy image as the next image. In this case, where both of the message-side image and the address-side image are the above-indicated image located foremost, the address-side image is displayed with a higher priority. After S718, the CPU 11, at S407 executed thereafter, scrolls the currently displayed image 60 in the rightward direction and changes the image 60 to be next displayed on the LCD 16 to the next image set at S718.

When the CPU 11 determines at S717 that there exist no address-side image and the message-side image which has the same sending year as the currently displayed year and which has the sender who is located rearward of the currently displayed person (S717: No), the CPU 11 executes S719 and ends the processing. At S719, the CPU 11 refers to the arrangement information for the message-side images and the arrangement information for the address-side images. Further, where an image having the same sending year as the currently displayed year and having the sender who is located at the foremost position in the arrangement order of the senders, namely, who is located at the top in the arrangement order along the first axis, is the address-side image, the CPU 11 sets the address-side image in question as the next image. On the other hand, where the image having the sender who is located at the foremost position in the arrangement order along the first axis is the message-side image, the CPU 11 sets a dummy image as the next image. After S719, the CPU 11, at S407 executed thereafter, scrolls the currently displayed image 60 in the leftward direction and changes the image 60 to be next displayed on the LCD 16 to the next image set at S719. At S719, where there exist, for the senders other than the sender of the currently displayed address-side image, no address-side image and message-side image having the same sending year as the sending year of the address-side image, the currently displayed address-side image is set as the next image.

Where the CPU 11 determines that the input operation is an operation other than the scroll operation in the up-down direction or the right-left direction (S701: other operation), the CPU 11 executes S801 in FIG. 10 and determines the kind of the input operation as in S701. When the CPU 11 determines that the input operation is a tap operation on the currently displayed address-side image 60 (S801: image tap), the CPU 11 generates arrangement information for the image data of the message-side images in the form of the two-dimensional matrix in which the first axis represents the sender and the second axis represents the sending year and stores the generated arrangement information in the RAM 13 (S802).

The CPU 11 determines whether there exists a message-side image having the same sender and the same sending year as those of the currently displayed address-side image (S803). When the CPU 11 determines that such a message-side image exists (S803: Yes), the CPU 11 sets the message-side image in question as the next image (S804). Thereafter, the CPU 11 ends the processing. After S804, the CPU 11, at S407 executed thereafter, changes the currently displayed address-side image 60 to the message-side image set as the next image at S804. Consequently, the message-side image 60 is displayed on the LCD 16 as if the postcard is turned over such that the address side of the postcard faces downward.

On the other hand, when the CPU 11 determines that there exist no message-side image having the same sender and the same sending year as those of the currently displayed address-side image (S803: No), the CPU 11 sets the currently displayed address-side image as the next image (S805). Thereafter, the CPU 11 ends the processing. Since the next image is identical to the currently displayed address-side image in this case, the CPU 11 maintains, at S407 executed thereafter, the currently displayed image 60 as it is.

When the CPU 11 determines at S801 that the input operation is a tap operation on the icon 65 (S801: help), the CPU 11 displays the help images so as to be overlaid on the currently displayed address-side image, as in S606 (S806). The CPU 11 waits for an input operation to close the help images (S807: No).

When the CPU 11 determines that the operation to close the help images is input (S807: Yes), the CPU 11 sets the currently displayed address-side image as the next image (S808) and ends the processing. Since the next image is identical to the currently displayed address-side image in this case, the CPU 11 maintains, at S407 executed thereafter, the currently displayed image 60 as it is.

When the CPU 11 determines at S801 that the input operation is a tap operation on any one of the icons 66*a*-66*c* (S801: narrowing down), the address-side images that are elements constituting the current arrangement information are narrowed down based on criteria according to the tapped one of the icons 66*a*-66*c* (S809). The CPU 11 then generates arrangement information for the image data of the address-side images obtained after narrowing down in the form of the two-dimensional matrix in which the first axis represents the sender while the second axis represents the sending year. The generated information is stored in the RAM 13 (S810).

The CPU 11 determines whether the currently displayed image 60 satisfies the criteria, namely, the currently displayed image 60 is included in the address-side images obtained after narrowing down (S811). When the CPU 11 determines that the currently displayed image 60 satisfies the criteria (S811: Yes), the CPU 11 executes S808. In this case, the currently displayed image 60 continues to be displayed. When narrowing down is executed at S809, the total image number 64*a* displayed as the header information on the LCD 16 is equal to the number of the address-side images obtained after narrowing down.

When the CPU 11 determines that the currently displayed image 60 does not satisfy the criteria (S811: No), the CPU 11 refers to the arrangement information generated at S810 and sets, as the next image, one of the address-side images obtained after narrowing down which has the same sender as the sender corresponding to the currently displayed address-side image and which has the newest sending year (S812). Thereafter, the CPU 11 ends the processing. After S812, the CPU 11, at S407 executed thereafter, changes the currently displayed image 60 to the next image set at S812.

According to the illustrated embodiment, when the scroll operation in the right-left direction is performed, it is possible to successively display images having the same sending year but having the senders that are mutually different. When the scroll operation in the up-down direction is performed, it is possible to successively display images having the same sender but having the sending years that are mutually different. Consequently, a desired image can be selected and displayed while freely changing conditions, among the images of many postcards received from many senders every year. Thus, the viewability in an album function can be enhanced.

According to the illustrated embodiment, in the message-side processing, when the value of the first axis or the value of the second axis is changed by one with respect to given image data in one scroll operation, namely, in one flick operation in the present embodiment, a message-side image of image data which is the closest to the given image data in the scroll direction is displayed even if image data immediately adjacent to the given image data in the scroll direction does not exist in the two-dimensional matrix. Consequently, no trouble is encountered even in such a situation in which the image data does not partially exist in the two-dimensional matrix.

According to the illustrated embodiment, the images can be narrowed down based on the tag information. After narrowing down of the images based on the tag information, the arrangement information in the form of the two-dimensional matrix is re-generated. It is thus possible to select and display, after narrowing down of the images, a desired image while freely changing conditions, so that the desired image can be displayed more easily.

Where images obtained after narrowing down based on the tag information do not include an image that has been displayed before narrowing down, there is displayed one of the images obtained after narrowing down that has the sender common or identical to the sender of the image that has been displayed before narrowing down. Consequently, it is possible to avoid a situation in which the image to be displayed after narrowing down has no relevance to the image that has been displayed before narrowing down, thereby preventing the user from having an unnatural feeling or confusion. Further, the total image number 64a is changed, after narrowing down, to the total number of images whose senders are common to the sender of the image to be displayed after narrowing down, so that a status after narrowing down can be notified to the user.

According to the illustrated embodiment, every time when the currently displayed image 60 is tapped, the message-side image and the address-side image can be switched alternately. It is thus possible to view the two images associated with each other in an easy operation. Further, when the message-side image is changed to the address-side image, the arrangement information in the form of the two-dimensional matrix the address-side image is re-generated for the address-side images. It is thus possible to select and display a desired image while freely changing conditions.

In the illustrated embodiment, the application 12b is one example of a the display program. The terminal device 10 is one example of a display device. The CPU 11 is one example of a controller. The LCD 16 is one example of a display unit. The touch panel is one example of an operation portion. The RAM 13 is one example of a memory connected to the display device. The sender is one example of a first condition. The sending year is one example of a second condition. The right-left direction is one example of a first direction. The leftward direction is one example of a forward direction in the first direction. The rightward direction is one example of a reverse direction in the first direction. The up-down direction is one example of a second direction. The upward direction is one example of a forward direction in the second direction. The downward direction is one example of a reverse direction in the second direction. The CPU 11 that executes S402 and S407 is one example of an image display processing. The CPU 11 that executes S401 is one example of an arrangement-information storage processing. The CPU 11 that executes S501 is one example of a scroll-direction determination processing. The CPU 11 that executes S515, S516, S518, and S519 is one example of a first image-setting processing. The CPU 11 that executes S506, S507, S509, and S510 is one example of a second image-setting processing. The CPU 11 that executes S404 is one example of a tag acceptance processing. The CPU 11 that executes S609 is one example of a narrow-down processing. The CPU 11 that executes S610 is one example of a second arrangement-information storage processing. The CPU 11 that executes S403 and S411 is one example of an image-number display processing. The CPU 11 that executes S715, S716, S718, and S719 is one example of a third image-setting processing. The CPU 11 that executes S706, S707, S709, and S710 is one example of a fourth image-setting processing. The CPU 11 that executes S602 is one example of a third arrangement-information storage processing. The CPU 11 that executes S606 and S806 is one example of a guidance display processing.

While the embodiment of the present invention has been described in detail, it is to be understood that the invention is not limited to the details of the embodiment illustrated above, but may be embodied with other changes and modifications without departing from the spirit and the scope of the invention in appended claims.

In the illustrated embodiment, the terminal device 10 such as a smartphone is illustrated as the display device on which the application 12b is installed. There may be employed, as the display device on which the application 12b is installed, a tablet terminal device, a personal computer, a digital camera, or the like. While the OS12a of the terminal device 10 is the Android OS in the illustrated embodiment, another OS may be employed.

In the illustrated embodiment, the image is scrolled in the up-down direction and the right-left direction based on the scroll operation detected by the touch panel 17. The image may be scrolled in the up-down direction and the right-left direction based on an operation on mechanical keys capable of indicating the up-down direction and the right-left direction. In such a modified example, the operation keys 15 as the mechanical keys are one example of "operation portion". In the illustrated embodiment, the scroll operation is the flick operation. In a case where buttons capable of indicating the up-down direction and the right-left direction are provided on the touch panel 17, the image may be scrolled in directions indicated by the buttons, so as to be scrolled in the up-down direction and the right-left direction.

While the scroll operation is the flick operation in the illustrated embodiment, the scroll operation may be a drag operation. The drag operation is an operation in which an input tool such as a user's finger is moved in an operating direction with the input tool kept touched on or kept located near the touch panel 17. Where the scroll operation is the drag operation, an amount of change in the value of the first axis or the value of the second axis in accordance with the scroll direction may be increased with an increase in an operation amount of the drag operation. In the illustrated embodiment, the value of the first axis or the value of the second axis is changed by one in one flick operation. The amount of change in the value of the first axis or the value of the second axis in accordance with the scroll direction may be increased with an increase in an operating speed of the flick operation.

In the illustrated embodiment, the images of the postcards are displayed utilizing the album function of the application 12b. Images other than the images of the postcards may be displayed utilizing the album function of the application 12b. In this case, where two images are associated with each other, the two images can be alternately displayed by the tap operation thereon.

In the illustrated embodiment, the arrangement information in the form of the two-dimensional matrix is used. There may be used two-dimensional matrix data in which image data per se are arranged. While the arrangement information is stored in the RAM 13 of the terminal device 10 in the illustrated embodiment, the arrangement information may be stored in an external memory such as the memory card MC. In this case, the external memory such as the memory card MC is one example of "the memory connected to the display device".

In the illustrated embodiment, the image data are arranged in the two-dimensional matrix. The image data may be created in a three-dimensional matrix additionally including a third axis. In this case, in addition to the scroll operation in the up-down direction and the right-left direction, a tap operation on the currently displayed image 60 may be utilized so as to change the currently displayed image 60 to another image in a direction of the third-axis. For instance, every time when the tap operation is performed on the currently displayed image 60, changing from the message-side image to the address-side image and changing of the currently displayed image 60 to an image of another kind of postcard having the same sender and the sending year as those of the currently displayed image 60 may be repeated. In this case, the third axis may represent a kind of seasonal postcards, for instance. Examples of such seasonal postcards include New Year's cards, summer greeting cards, winter greeting cards, and Christmas cards.

While the message-side image is initially displayed in the illustrated embodiment, the address-side image may be initially displayed.

In the illustrated embodiment, where there does not exist an image that is adjacent, in a direction according to the scroll operation, to the currently displayed message-side image in the two-dimensional matrix, there is displayed another image based on image data that is nearest to the image data of the currently displayed message-side image in the direction according to the scroll operation. Instead, a dummy image may be displayed. In this case, the dummy image may include the sender information and the sending-year information in the direction according to the scroll operation. Specifically, the CPU 11 may determine after S502 and/or S511 whether or not the image adjacent to the currently displayed message-side image in the direction according to the scroll operation exists. When an affirmative determination is made, the CPU 11 may set the adjacent image as the next image and thereafter may end the message-side processing. On the other hand, when a negative determination is made, the CPU 11 may set the dummy image as the next image and thereafter may end the message-side processing. Where this configuration is employed in only one of the scroll operation in the up-down direction and the scroll operation in the right-left direction, the configuration of the illustrated embodiment may be employed in the other of the scroll operation in the up-down direction and the scroll operation in the right-left direction.

In the illustrated embodiment, where no address-side image exist in the direction according to the scroll operation in the two-dimensional matrix and the message-side image exists in a state in which the address-side image is being displayed, the dummy image is displayed. Instead, as in the message-side processing, the address-side image of the image data that is the nearest, in the direction according to the scroll operation, to the currently displayed address-side image may be displayed.

In the illustrated embodiment, the dummy image is displayed in a case where the message-side image exists while the address-side image does not exist in the address-side processing. Where there does not exists the address-side image that is adjacent, in the direction according to the scroll operation, in the two-dimensional matrix, to the currently displayed address-side image in a state in which the address-side image is being displayed, the dummy image may be displayed irrespective of whether the message-side image is present or not. Specifically, the CPU 11 may determine after S702 and/or S711 whether or not the image adjacent to the currently displayed address-side image in the direction according to the scroll operation exists. Where an affirmative determination is made, the CPU 11 may set the adjacent image as the next image and thereafter may end the address-side processing. On the other hand, where a negative determination is made, the CPU 11 may set the dummy image as the next image and thereafter may end the address-side processing.

In the illustrated embodiment, it is determined at S705, S708, S714, and S717 in the address-side processing whether there exist any image that satisfy the respective conditions by referring to the arrangement information for the message-side images and the arrangement information for the address-side images. Only the arrangement information for the message-side images may be referred to. That is, where there exist any address-side image associated with the message-side image that satisfy the corresponding condition, the address-side image in question may be set as the next image. On the other hand, where there exist no address-side image associated with the message-side image that satisfies the corresponding condition, the dummy image may be set as the next image. In this case, S602 and S802 may be omitted.

In the illustrated embodiment, the dummy image is an image including the sender information and the sending-year information. The dummy image may be an image including other information or an image not including the sender information and the sending-year information. The dummy image may be an image having a specific design. However, in a case where the dummy image includes contents that can specify the image such as the sender information and the sending-year information, it is possible to notify the user of information relating to the not-existing image.

In the illustrated embodiment, the icons 66a-66c are provided and narrowing down based on one sort of tag information is performed by the tap operation on one of the icons 66a-66c. There may be performed narrowing down based on a plurality sorts of tag information.

In the illustrated embodiment, the total image number 64a displayed as the header information represents the total number of postcards having the same sender as the sender of the postcard corresponding to the currently displayed image 60. Instead, the total number of images of the postcards having the same sending year as the sending year of the postcard corresponding to the currently displayed image 60 may be displayed as the header information.

In the illustrated embodiment, the directions of change of the sender or the sending year with respect to the image to be next displayed are indicated by the guidance indicators 81-84, as shown in FIG. 2B. Instead, there may be displayed a specific sender or a sending year of the image to be next displayed. For instance, in a state in which an image of a postcard whose sender is person "B" and whose sending year is the year of 2014 is displayed, "the year of 2015" may be displayed as the guidance 81, "the year of 2013" may be displayed as the guidance 82, "person A" may be displayed as the guidance 83, and "person C" may be displayed as the guidance 84.

In the illustrated embodiment, the first axis represents the sender of the postcard while the second axis represents the sending year of the postcard. Each of the first axis and the second axis may represent other sorts of information relating to the image data. For instance, there may be employed, as information represented by each of the first axis and the second axis, a place, a kind of the image (such as JPEG or TIFF), a size of the image, and a creation date of the image data.

In the illustrated embodiment, the CPU 11 executes the processings in FIGS. 4-10. A plurality of CPUs may cooperatively execute the processings in FIGS. 4-10. Further, IC such as ASIC may execute solely or a plurality of ICs may cooperatively execute the processings in FIGS. 4-10. Moreover, the CPU and IC such as ASIC may cooperate with each other to execute the processings in FIGS. 4-10.

A part of the processings in FIGS. 4-10 may be omitted or changed without departing from the scope defined in independent claims.

What is claimed is:

1. A non-transitory storage medium storing a display program executable by a controller of a display device comprising: a display unit; and an operation portion configured to receive an input operation, wherein the display program, when executed by the controller, causes the display device to execute:

an image display processing for displaying, on the display unit, an image based on a corresponding one of a plurality of sets of image data stored in a memory connected to the display device;

an arrangement-information storage processing for storing, in the memory, arrangement information for arranging the plurality of sets of image data along a first direction according to a first condition and along a second direction according to a second condition different from the first condition, the first direction and the second direction intersecting each other;

a scroll-direction determination processing for determining whether a scroll direction of a currently displayed image by a scroll operation is in the first direction or in the second direction when an input operation received through the operation portion is the scroll operation, the scroll operation being for scrolling the currently displayed image that is being currently displayed on the display unit;

a first image-setting processing for setting, as a target image, an image based on image data arranged in the first direction with respect to image data of the currently displayed image on the display unit, when it is determined in the scroll-direction determination processing that the scroll direction is in the first direction, the target image being specified by a value of a parameter in the first direction indicating the first condition and a value of a parameter in the second direction indicating the second condition, the parameter in the first direction and the parameter in the second direction being mutually different from each other; and a second image-setting processing, for setting, as the target image, an image based on image data arranged in the second direction with respect to the image data of the currently displayed image on the display unit, on the basis of the arrangement information, when it is determined in the scroll-direction determination processing that the scroll direction is in the second direction, the target image being specified by the value of the parameter in the first direction and the value of the parameter in the second direction, wherein the target image is displayed on the display unit in the image display processing when the target image is specified by the value of the parameter in the first direction and the value of the parameter in the second direction in the first image-setting processing or in the second image-setting processing, wherein, in the first image-setting processing, when the value of the parameter in the first direction is changed from a first value to a second value while the value of the parameter in the second direction indicating the second condition is maintained at a first value, a first image based on image data specified by the first value of the parameter in the second direction and the second value of the parameter in the first direction is set as the target image while any images specified by any values, other than the first value of the parameter in the second direction and any values, other than the second value of the parameter in the first direction are not set as the target image, and the first image is displayed so as to scroll, when it is determined in the scroll-direction determination processing that the scroll direction is in the first direction, wherein, in the second image-setting processing, the value of the parameter in the second direction is changed from the first value to a second value while the value of the parameter in the first direction is maintained at the first value, a second image based on image data specified by the first value of the parameter in the first direction and the second value of the parameter in the second direction is set as the target image while any images specified by any values, other than the first value of the parameter in the first direction and any values, other than the second value of the parameter in the second direction are not set as the target image, and the second image is displayed so as to scroll, when it is determined in the scroll-direction determination processing that the scroll direction is in the second direction, wherein, in the display processing, (a) the first image, (b) a first parameter indicator, (c) a second parameter indicator and (d) four guidance indicators are displayed on the display unit when only the first image is set as the target image in the first image-setting processing, the first parameter indicator indicating the value of the parameter of the first image in the first direction, the second parameter indicator indicating the value of the parameter of the first image in the second direction, the four guidance indicators respectively corresponding to a forward direction in the first direction, a reverse direction in the first direction, a forward direction in the second direction and a reverse direction in the second direction and each representing a change of the parameter of the first image, wherein, in the display processing, (a) the second image, (b) the first parameter indicator, (c) the second parameter indicator and (d) the four guidance indicators are displayed on the display unit when only the second image is set as the target image in the second image-setting processing, the first parameter indicator indicating the value of the parameter of the second image in the first direction, the second parameter indicator indicating the value of the parameter of the second image in the second direction, the four guidance indicators respectively corresponding to the forward direction in the first direction, the reverse direction in the first direction, the forward direction in the second direction and the reverse direction in the second direction and each representing a change of the parameter of the second image.

2. The storage medium according to claim 1,
wherein the display program, when executed by the controller, further causes:
the display device to determine the scroll direction that is one of the forward direction and the reverse direction in the first direction;
the display device to determine a new parameter in the first direction based on a scrolled amount; and
the display device to determine whether there is image data specified by the new parameter in the first direction and the parameter in the second direction in the arrangement information;
 wherein, when the image data specified by the new parameter in the first direction and the parameter in the second direction exists in the arrangement information, the target image is set based on the image data in the first image-setting processing;
 wherein, when the image data specified by the new parameter in the first direction and the parameter in the second direction does not exist in the arrangement information, the display program, when executed by the controller, further causes the display device to determine the closest parameter to the new parameter in the scroll direction;
wherein the target image is set in the first image-setting processing based on image data in the arrangement information specified by the closest parameter in the first direction and the parameter in the second direction;
wherein the display program, when executed by the controller, further causes:
the display device to determine the scroll direction that is one of the forward direction and the reverse direction in the second direction;
the display device to determine a new parameter in the second direction based on a scrolled amount; and
the display device to determine whether there is image data specified by the new parameter in the second direction and the parameter in the first direction in the arrangement information;
 wherein, when the image data specified by the new parameter in the second direction and the parameter in the first direction exists in the arrangement information, the target image is set based on the image data in the second image-setting processing;
 wherein, when the image data specified by the new parameter in the second direction and the parameter in the first direction does not exist in the arrangement information, the display program, when executed by the controller, further causes the display device to determine the closest parameter to the new parameter in the scroll direction; and
wherein the target image is set in the second image-setting processing based on the image data in the arrangement information specified by the closest parameter in the second direction and the parameter in the first direction.

3. The storage medium according to claim 1,
wherein one or a plurality of sets of tag information are associated with each of the plurality of sets of image data, wherein the display program, when executed by the controller, causes the display device to execute:
 a tag acceptance processing for accepting selection of a certain number of sets of the tag information among the one or the plurality of sets of the tag information,
 a narrow-down processing for narrowing down the plurality of sets of image data according to the selected certain number of sets of the tag information when the certain number of sets of the tag information are accepted in the tag acceptance processing, and
 a second arrangement-information storage processing for storing, in the memory, arrangement information for arranging a plurality of sets of image data obtained after narrowing down in the narrow-down processing along the first direction according to the first condition and along the second direction according to the second condition.

4. The storage medium according to claim 3,
wherein the display program, when executed by the controller, causes the display device to execute an image-number display processing for displaying the number of sets of image data among the plurality of sets of image data that are identical in the parameter in the first direction indicating the first condition to the image data corresponding to the currently displayed image on the display unit, on the basis of the arrangement information,
wherein, when the plurality of sets of image data are narrowed down in the narrow-down processing, the display program, when executed by the controller, further causes the display device to determine whether the image data corresponding to the currently displayed image is included among the plurality of sets of image data obtained after narrowing down in the narrow-down processing;
wherein the currently displayed image continues to be displayed in the image display processing when it is determined the image data corresponding to the currently displayed image is included among the plurality of sets of image data obtained after narrowing down in the narrow-down processing;
wherein an image based on image data having the parameter in the first direction identical to that of the image data of the currently displayed image is displayed on the display unit when it is determined the image data corresponding to the currently displayed image is not included among the plurality of sets of image data obtained after narrowing down in the narrow-down processing; and
wherein, when the plurality of sets of image data are narrowed down in the narrow-down processing, the number of sets of image data, among the plurality of sets of image data obtained after narrowing down in the narrow-down processing, that are identical in the parameter in the first direction to the image data corresponding to the currently displayed image displayed on the display unit in the image display processing is displayed on the display unit.

5. The storage medium according to claim 3, wherein, in the image display processing, the image based on the image data is displayed on the display unit, together with information indicative of the tag information associated with the image data.

6. The storage medium according to claim 1, wherein the display program, when executed by the controller, causes the display device to execute a second image display processing in which an image based on second image data is displayed, the second image data being associated with the image data of the currently displayed image, when the input operation received through the operation portion is a selecting operation with respect to the currently displayed image on the display unit.

7. The storage medium according to claim 6,
wherein each of the plurality of sets of image data is image data of an image to be formed on a message side of each of a plurality of postcards, and
wherein the second image data is image data of an image to be formed on an address side of one of the plurality of postcards that has the message side on which the image based on the image data associated with the second image data is to be formed.

8. The storage medium according to claim 6,
wherein the display program, when executed by the controller, causes the display device to execute:
a third image-setting processing in which, when it is determined in the scroll-direction determination processing that the scroll direction is in the first direction in a state in which the image based on the second image data is displayed, the parameter in the first direction indicating the first condition is changed while the parameter in the second direction indicating the second condition is maintained on the basis of the arrangement information, and an image based on second image data specified by the maintained parameter in the second direction and the changed parameter in the first direction is set as the target image; and
a fourth image-setting processing in which, when it is determined in the scroll-direction determination processing that the scroll direction is in the second direction in the state in which the image based on the second image data is displayed, the parameter in the second direction is changed while the parameter in the first direction is maintained on the basis of the arrangement information, and an image based on second image data specified by the maintained parameter in the first direction and the changed parameter in the second direction is set as the target image, and
wherein, when the target image is set in the third image-setting processing or in the fourth image-setting processing, the target image is displayed on the display unit in the second image display processing.

9. The storage medium according to claim 8,
wherein the display program, when executed by the controller, further causes:
the display device to determine the scroll direction that is one of the forward direction and the reverse direction in the first direction;
the display device to determine a new parameter in the first direction based on a scroll amount; and
the display device to determine whether there is second image data specified by the new parameter in the first direction and the parameter in the second direction in the arrangement information;
wherein, when the second image data specified by the new parameter in the first direction and the parameter in the second direction exists in the arrangement information, the target image is set based on the second image data in the third image-setting processing;
wherein, when the second image data specified by the new parameter in the first direction and the parameter in the second direction does not exist in the arrangement information, a predetermined image is set as the target image in the third image-setting processing;
wherein the display program, when executed by the controller, further causes:
the display device to determine the scroll direction that is one of the forward direction and the reverse direction in the second direction;
the display device to determine a new parameter in the second direction based on a scroll amount; and
the display device to determine whether there is second image data specified by the new parameter in the second direction and the parameter in the first direction in the arrangement information;
wherein, when the second image data specified by the new parameter in the second direction and the parameter in the first direction exists in the arrangement information, the target image is set based on the second image data in the fourth image-setting processing;
wherein, when the second image data specified by the new parameter in the second direction and the parameter in the first direction does not exist in the arrangement information, a predetermined image is set as the target image in the fourth image-setting processing.

10. The storage medium according to claim 9,
wherein the predetermined image set in the third image-setting processing is an image including information that can specify the image data specified by the parameter in the second direction and the new parameter in the first direction, and
wherein the predetermined image set in the fourth image-setting processing is an image including information that can specify the image data specified by the parameter in the first axis and the new parameter in the second direction.

11. The storage medium according to claim 6,
wherein the display program, when executed by the controller, causes the display device to execute:
a third arrangement-information storage processing for storing, in the memory, arrangement information for arranging the second image data along the first direction according to the first condition and along the second direction according to the second condition where the input operation received through the operation portion is the selecting operation with respect to the currently displayed image on the display unit,
a third image-setting processing in which, when it is determined in the scroll-direction determination processing that the scroll direction is in the first direction in a state in which the image based on the second image data is displayed, the parameter in the first direction indicating the first condition is changed while the parameter in the second direction indicating the second condition is maintained on the basis of the arrangement information stored in the memory in the third arrangement-information storage processing, and an image based on second image data specified by the maintained parameter in the second direction and the changed parameter in the first direction is set as the target image; and a fourth image-setting processing in which, when it is determined in the scroll-direction determination processing that the scroll direction is in the second direction in the state in which the image based on the second image data is displayed, the parameter in the second direction is changed while the parameter in the first direction is maintained on the basis of the arrangement information stored in the memory in the third arrangement-information storage processing, and an image based on second image data specified by the maintained parameter in the first direction and the changed parameter in the second direction is set as the target image, and wherein the target image is set in each of the third image-setting processing and the fourth image-setting processing on the basis of the arrangement information stored in the memory in the third arrangement-information storage processing.

12. The storage medium according to claim 1, wherein each of the plurality of sets of image data is image data of an image to be formed on a message side or an address side of each of a plurality of postcards, wherein the first condition is a sender of each of the plurality of postcards associated with and corresponding to a corresponding one of the plurality of sets of image data, and wherein the second condition is a sending year of each of the plurality of the postcards associated with and corresponding to a corresponding one of the plurality of sets of image data.

13. The storage medium according to claim 12, wherein the display program, when executed by the controller, causes the display device to execute a guidance display processing for displaying guidance, together with the image based on the image data, the guidance including: indicators each of which represents the scroll direction of the scroll operation to be received through the operation portion and which represent four directions including a forward direction and a reverse direction in the first direction and a forward direction and a reverse direction in the second direction; and indicators each of which represents a direction of change of the sender or the sending year for a corresponding one of the four directions.

14. The storage medium according to claim 1, wherein, in the display processing, an operation-receiving image is displayed on the display unit, and wherein, in the display processing, the four guidance indicators are displayed when an input operation to the operation-receiving image is received through the operation portion.

15. The storage medium according to claim 1, wherein, in the display processing, the four guidance indicators are respectively displayed at a first side of the target image in the first direction, a second side of the target image in the first direction, a first side of the target image in the second direction and a second side of the target image in the second direction.

* * * * *